United States Patent
Miyazaki et al.

(10) Patent No.: US 9,822,281 B2
(45) Date of Patent: Nov. 21, 2017

(54) POLYAMIDE ACID AND RESIN COMPOSITION CONTAINING SAME

(71) Applicant: TORAY INDUSTRIES, INC., Tokyo (JP)

(72) Inventors: Daichi Miyazaki, Otsu (JP); Masao Tomikawa, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/225,569

(22) Filed: Aug. 1, 2016

(65) Prior Publication Data

US 2016/0340547 A1 Nov. 24, 2016

Related U.S. Application Data

(62) Division of application No. 14/387,609, filed as application No. PCT/JP2013/059165 on Mar. 28, 2013, now abandoned.

(30) Foreign Application Priority Data

Mar. 29, 2012 (JP) ................. 2012-076500

(51) Int. Cl.
| | |
|---|---|
| C08L 77/00 | (2006.01) |
| D21H 17/55 | (2006.01) |
| C08F 8/00 | (2006.01) |
| C08L 83/00 | (2006.01) |
| C08G 69/26 | (2006.01) |
| C09D 179/08 | (2006.01) |
| C08G 73/10 | (2006.01) |
| C08G 69/44 | (2006.01) |

(52) U.S. Cl.
CPC ........... *C09D 179/08* (2013.01); *C08G 69/44* (2013.01); *C08G 73/101* (2013.01); *C08G 73/1007* (2013.01); *C08G 73/1067* (2013.01); *C08G 73/1071* (2013.01); *C08G 73/1075* (2013.01); *C08G 73/1082* (2013.01); *C08G 2150/00* (2013.01)

(58) Field of Classification Search
None
See application file for complete search history.

(56) References Cited

U.S. PATENT DOCUMENTS

| | | | |
|---|---|---|---|
| 4,963,645 A | 10/1990 | Inoue et al. | |
| 5,364,891 A | 11/1994 | Pears | |
| 2001/0056174 A1 | 12/2001 | Okada et al. | |
| 2010/0009206 A1 | 1/2010 | Ataka et al. | |
| 2010/0203324 A1 | 8/2010 | Iizumi | |

FOREIGN PATENT DOCUMENTS

| | | | |
|---|---|---|---|
| EP | 1 818 354 A2 * | 1/2007 | |
| JP | 47-16980 B | 5/1972 | |
| JP | 64-54029 A | 3/1989 | |
| JP | 6-102667 A | 4/1994 | |
| JP | 2001-335619 A | 12/2001 | |
| JP | 2009-109589 A | 5/2009 | |
| WO | WO 2008/013210 A1 | 1/2008 | |
| WO | WO 2008/013288 A1 | 1/2008 | |

OTHER PUBLICATIONS

Bowles et al., "Isothermal Aging Effects on PMR-15 Resin", Sampe Quarterly, Jan. 1993, vol. 24, No. 2, pp. 2-9.
International Search Report (Form PCT/ISA/210) and English translation thereof, dated Jun. 25, 2013, for International Application No. PCT/JP2013/059165.
Kim et al., "Phosgen-free Synthesis of Oligoureas Having Amino End-groups: Their Application to the Synthesis of Poly(urea-imide)", Fibers and Polymers, vol. 3, No. 2, 2002, pp. 55-59.
Mukaiyama et al., "Novel Method for the Preparation of Organic Isocyanates", J. Org. Chem., vol. 26, Nov. 1961, pp. 4381-4384.
St. Clair et al., "Addition Polyimide Adhesives Containing Various End Groups", Polymer Engineering and Science, vol. 22, No. 1, Nov. 1982, pp. 9-14.
Takeichi et al., "Blend of Polyimide Having Internal Acetylene Units and Oligoimide End-Capped with Biphenylenes", Journal of Polymer Science: Part A: Polymer Chemistry, vol. 28, 1990, pp. 3377-3385.
Takekoshi et al., "High-temperature thermoset polyimides containing disubstituted acetylene end groups", Polymer, vol. 35, No. 22, 1994, pp. 4874-4880.
Kricheldorf, H.R. et al, "Advances in Polymer Science," Progess in Polyimide Chemistry I, vol. 140, pp. 1-59.
U.S. Office Action for U.S. Appl. No. 14/387,609 dated Feb. 2, 2016.
U.S. Office Action for U.S. Appl. No. 14/387,609 dated Jun. 24, 2015.
U.S. Office Action for U.S. Appl. No. 14/387,609, dated May 10, 2016.
U.S. Office Action for U.S. Appl. No. 14/387,609, dated Sep. 8, 2015.

* cited by examiner

Primary Examiner — Robert T Butcher
(74) Attorney, Agent, or Firm — Birch, Stewart, Kolasch & Birch, LLP

(57) ABSTRACT

A polyamic acid useful for forming a protective or insulative layer for semiconductor elements has a structure represented by chemical formula (1):

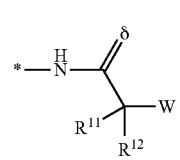

(1)

wherein δ represents an oxygen or sulfur atom; W represents an electron-withdrawing group; and $R^{11}$ and $R^{12}$ represent independently a hydrogen atom or a hydrocarbon group having 1 to 10 carbon atoms.

4 Claims, 2 Drawing Sheets

POLYAMIDE ACID AND RESIN COMPOSITION CONTAINING SAME

This application is a Divisional of U.S. patent application Ser. No. 14/387,609 filed on Sep. 24, 2014, which is the national stage entry of international application PCT/JP2013/059165 filed on Mar. 28, 2013, which claims priority to Application No. 2012-076500 filed in Japan on Mar. 29, 2012, all of which are hereby expressly incorporated by reference into the present application.

TECHNICAL FIELD

The present invention relates to polyamic acid. More specifically, the invention relates to polyamic acid that can be used favorably as material for surface protect film and interlayer insulation film of semiconductor elements, insulation layers and spacer layers of organic electroluminescent elements (organic EL elements), planarizing film of thin film transistor substrates, insulation layers of organic transistors, flexible printed boards, substrates for flexible display, substrates for flexible electronic paper, substrates for flexible solar batteries, substrates for flexible color filters, binders for electrodes of lithium ion secondary batteries, and adhesives for semiconductors.

BACKGROUND ART

With good electrical insulating properties, heat resistance, and mechanical characteristics, polyimides have been used in a variety of fields including semiconductor production. Polyimides generally tend to be insoluble in solvents and thermally infusible and accordingly, difficult to mold or process directly. For film formation, therefore, a solution (hereinafter, referred to as varnish) containing polyamic acid as a precursor of a polyimide is commonly used to form polyimide film through coating and curing steps for conversion. Such a varnish may be a solution as obtained from polymerization of polyamic acid or may be prepared by dissolving polyamic acid in a solvent.

In general, mechanical characteristics (elongation percentage and ultimate stress) of polyimide film can be improved effectively by increasing the degree of polymerization of the polyimide. As the degree of polymerization of polyamic acid increases, however, the viscosity of the polymerization solution increases, often causing troubles in the polymerization process. In addition, it will be difficult to adjust the varnish to a viscosity suitable for coating. The viscosity of a varnish can be adjusted appropriately through control of the polymerization degree of polyamic acid by changing the molar ratio between the acid anhydride group in the acid dianhydride monomer used and the amino group in the multivalent amine compound or diamine compound during the polymerization of polyamic acid. However, polyimides produced from this varnish have the same polymerization degree as the polymerization degree of the original polyamic acid, making it impossible to achieve high mechanical characteristics.

Accordingly, methods in which the polymerization degree is controlled by adding water or alcohol during the polymerization of polyamic acid to cap the acid anhydride end (Patent documents 1 and 2) and methods in which terminal amino groups are capped to control the polymerization degree of polyamic acid (Patent document 3) have been reported. If these methods are used, the end capping agent will be removed during the curing step, allowing the acid anhydride group and amino group to regenerate and take part in the polymerization reaction again. As a result, the polymerization degree of the resulting polyimide will increase, making it possible to produce polyimide film with good mechanical characteristics.

Besides the above ones, methods in which an end capping agent containing a thermally polymerizable group is used to introduce a thermally polymerizable group into the polyamic acid end have been reported (Non-patent documents 1 to 4). These methods are intended to improve the mechanical characteristics of polyimide film by causing reaction between the thermally polymerizable end groups during the curing step.

PRIOR ART DOCUMENTS

Patent Documents

Patent document 1: Japanese Examined Patent Publication (Kokoku) No. SHO-47-16980
Patent document 2: Japanese Unexamined Patent Publication (Kokai) No. HEI-6-102667
Patent document 3: Japanese Unexamined Patent Publication (Kokai) No. 2009-109589

Non-Patent Documents

Non-patent document 1: K. J. Bowles, D. Jayne, and T. A. Leonhard, SAMPE Quarterly, 24(2), p. 2 (1993)
Non-patent document 2: A. K. St Clair and T. St Clair, Polym. Eng. Sci., 22, p. 9 (1982)
Non-patent document 3: T. Takeichi, H. Date, and Y. Takayama, J. Polym. Sci., Part A: Polym. Chem., 28, p. 3377 (1990)
Non-patent document 4: T. Takekoshi and J. M. Terry, Polymer, 35, p. 4874 (1994)

SUMMARY OF THE INVENTION

Problems to be Solved by the Invention

A polyimide with a high polymerization degree is produced as a result of an increase in the polymerization degree of polyamic acid, which is achieved by causing the terminal acid anhydride group regenerated during curing to react with polyamic acid having an amino group at the end in the methods described in Patent documents 1 and 2 or by causing the terminal amino group regenerated during curing to react with polyamic acid having an acid anhydride group at the end in the method described in Patent document 3. In order to obtain a polyimide that has a sufficiently high polymerization degree by these methods, therefore, the quantity of the capped terminal amino group and that of the terminal acid anhydride group should be adjusted so that they account for the same proportion. This means that the methods described in Patent documents 1 to 3 have the disadvantage that the acid anhydride group in the acid dianhydride monomer and the amino group in the multivalent amine compound or diamine compound should account for the same molar concentration or the intended characteristics will not be achieved if their blending ratio is not exactly one.

In Non-patent documents 1 to 4, on the other hand, either the terminal acid anhydride group or terminal amino group is capped with an end capping agent that contains a thermally polymerizable group. In this case, the end capping agent is not removed and the thermally polymerizable groups react with each other. Accordingly, even if there are polyamic acid molecules having an acid anhydride group or amino group at the end, they are left unreacted during curing and fail to achieve a sufficiently high polymerization degree and the polyimide film resulting from the curing step will not have good mechanical characteristics.

An object of the present invention is to solve the above problem. Specifically, the invention aims to provide polyamic acid that can form a varnish with a low viscosity and serves to produce, through curing, polyimide film with good mechanical characteristics and further aims to provide polyimide film with good mechanical characteristics regardless of whether the molar concentration of the acid anhydride group in the acid dianhydride monomer and that of the amino group in the multivalent amine compound or diamine compound are the same or different from each other.

Means of Solving the Problems

The present invention provides polyamic acid containing a structure as represented by chemical formula (1).

[Chemical formula 1]

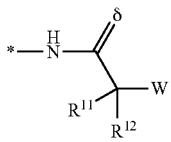

(1)

(In chemical formula (1), δ is an oxygen or sulfur atom and W is an electron-withdrawing group. $R^{11}$ and $R^{12}$ are independently a hydrogen atom or a hydrocarbon group having 1 to 10 carbon atoms.)

Advantageous Effect of the Invention

The invention can provide polyamic acid that can form a varnish with a low viscosity and serves to produce, through curing, polyimide film with good mechanical characteristics.

DESCRIPTION OF PREFERRED EMBODIMENTS

Figure 1:
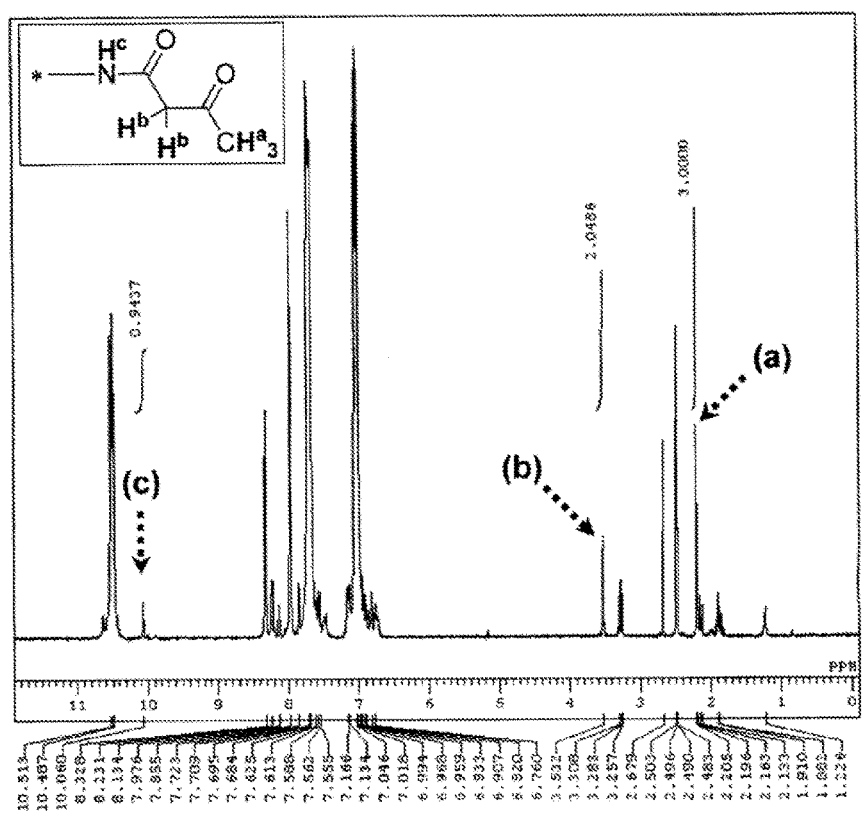
FIG. 1 shows a 1H-NMR spectrum of the polymer prepared in Example 12.

The present invention provides polyamic acid containing a structure as represented by chemical formula (1) given below.

[Chemical formula 2]

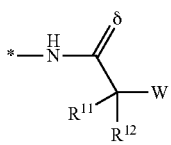

(1)

(In chemical formula (1), δ is an oxygen or sulfur atom and W is an electron-withdrawing group. $R^{11}$ and $R^{12}$ are independently a hydrogen atom or a hydrocarbon group having 1 to 10 carbon atoms.)

For the polyamic acid, W in the above chemical formula (1) is preferably represented by any of chemical formula (4) to (11) given below.

[Chemical formula 3]

(4)

(5)

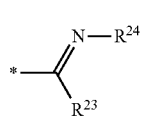

(6)

(7)

(8)

(9)

(10)

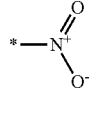

$*-C\equiv N$ (11)

($R^{21}$ to $R^{28}$ are independently a hydrocarbon group containing 1 to 10 carbon atoms or an organic group containing 1 to 10 carbon atoms which includes hydrogen and carbon as essential elements and 1 to 10 other atoms of elements selected from the group of boron, oxygen, sulfur, nitrogen, phosphorus, silicon, and halogens.)

More preferably, the structure given by the above chemical formula (1) is polyamic acid as represented by any one of chemical formulae (12) to (14) given below.

[Chemical formula 4]

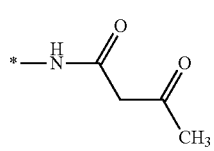

(12)

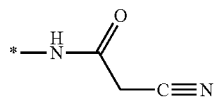

(13)

-continued (14)

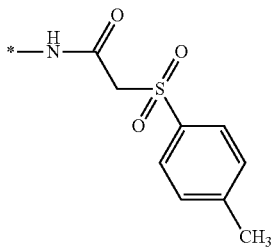

It is known that the structure given by the above chemical formula (12) can be converted into an isocyanate by heating as represented by chemical formula (21), as reported by, for example, T. Mukaiyama, M. Tokizawa, H. Nohira, and H. Takei, J. Org. Chem., 26, 4381 (1961).

[Chemical formula 5]

(21)

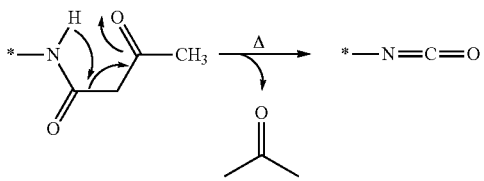

Furthermore, also in the case where δ in chemical formula (1) is oxygen while W is a group as represented by any of chemical formulae (4) to (11), the structure is expected to be converted into an isocyanate when heated, as shown in chemical formula (22) (when W is a group as represented by any of chemical formulae (4) to (10)) or in chemical formula (23) (when W is a group as represented by chemical formula (11), in the same way as in chemical formula (21)). (Here, chemical formula (22) and chemical formula (23) show reactions that occur when δ is oxygen, but it is expected that thermal conversion into an isothiocyanate also occurs through a similar reaction when δ is sulfur.)

[Chemical formula 6]

(22)

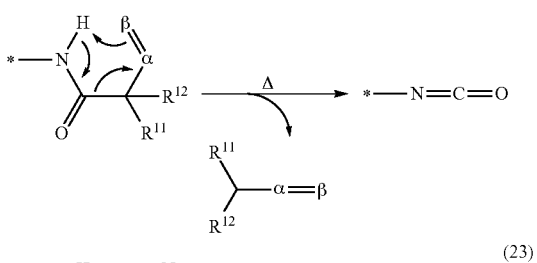

(23)

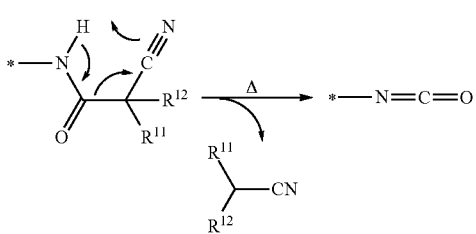

(In chemical formula (22), α represents $CR^{21}$ (in chemical formula (4)), $CR^{22}$ (in chemical formula (5)), $CR^{23}$ (in chemical formula (6)), $SR^{25}$ (in chemical formula (7)), $S(O)R^{26}$ (in chemical formula (8)), $PR^{27}R^{28}$ (in chemical formula (9)), or $N^+O^-$ (in chemical formula (10)). β represents O (for chemical formulae (4) and (7) to (10)), S (for chemical formula (5)), or $NR^{24}$ (for chemical formula (6)).)

If an isocyanate is reacted with an acid anhydride group, an imide group will be formed as shown by chemical formula (24). Accordingly, a polyimide with a high polymerization degree can be produced through a reaction with a polyamic acid having an acid anhydride group at, for example, a chain end. Furthermore, a polyimide with a high polymerization degree can also be produced if dimers or trimers are prepared through a reaction between isocyanates as shown by chemical formula (25). (It should be noted that reactions as given by chemical formula (24) and chemical formula (25) can occur when the isocyanate is an isothiocyanate.) As a result, it will be possible to obtain polyimide film with improved mechanical characteristics.

[Chemical formula 7]

(24)

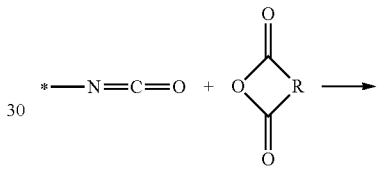

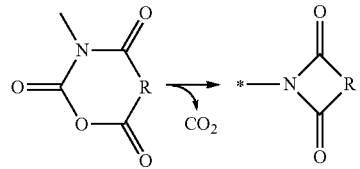

(In chemical formula (24), R denotes a divalent organic group.)

[Chemical formula 8]

(25)

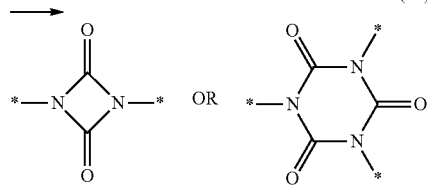

Here, it is preferable for the polyamic acid according to the present invention to contain a structure as shown by chemical formula (2) or (3). In chemical formula (2), a structure as shown by chemical formula (1) forms a side chain in a polyamic acid. In chemical formula (3), a structure as shown by chemical formula (1) is present at least at one end of a polyamic acid. Here, if k is 2 or larger in chemical formula (2), Zs may be bonded to different atoms.

[Chemical formula 9]

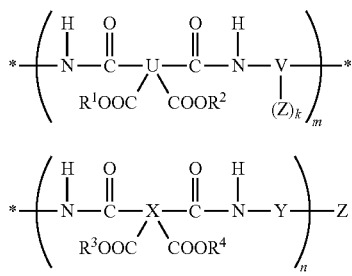

(In chemical formulae (2) and (3), U and X denote a tetravalent tetracarboxylic acid residue containing 2 or more carbon atoms, V denotes a tri- or higher-valent multivalent amine residue containing 2 or more carbon atoms, and Y denotes a divalent diamine residue containing 2 or more carbon atoms. Z denotes a structure of chemical formula (1) given above, and k, m, and n each show a positive integer. $R^1$ to $R^4$ independently denote a hydrogen atom, a hydrocarbon group containing 1 to 10 carbon atoms, or an alkyl silyl group containing 1 to 10 carbon atoms.)

U and X are preferably a tetravalent hydrocarbon group containing 80 or less carbon atoms and may be a tetravalent organic group containing 80 or less carbon atoms and including hydrogen and carbon as essential elements and one or more other atoms of elements selected from the group of boron, oxygen, sulfur, nitrogen, phosphorus, silicon, and halogens. For each of boron, oxygen, sulfur, nitrogen, phosphorus, silicon, and halogens, the number of atoms included is preferably in the range of 20 or less, more preferably in the range of 10 or less.

Examples of tetracarboxylic acid that can give U or X are as follows. Examples of such aromatic tetracarboxylic acid include monocyclic aromatic tetracarboxylic acid compounds such as pyromellitic acid and 2,3,5,6-pyridine tetracarboxylic acid; various isomers of biphenyl tetracarboxylic acid such as 3,3',4,4'-biphenyl tetracarboxylic acid, 2,3,3',4'-biphenyl tetracarboxylic acid, 2,2',3,3'-biphenyl tetracarboxylic acid, 3,3',4,4'-benzophenone tetracarboxylic acid, and 2,2',3,3'-benzophenone tetracarboxylic acid; bis(dicarboxyphenyl) compounds such as 2,2-bis(3,4-dicarboxyphenyl) hexafluoropropane, 2,2-bis(2,3-dicarboxyphenyl) hexafluoropropane, 2,2-bis(3,4-dicarboxyphenyl) propane, 2,2-bis(2,3-dicarboxyphenyl) propane, 1,1-bis(3,4-dicarboxyphenyl) ethane, 1,1-bis(2,3-dicarboxyphenyl) ethane, bis(3,4-dicarboxyphenyl) methane, bis(2,3-dicarboxyphenyl) methane, bis(3,4-dicarboxyphenyl) sulfone, and bis (3,4-dicarboxyphenyl) ether; bis(dicarboxyphenoxy phenyl) compounds such as 2,2-bis[4-(3,4-dicarboxyphenoxy) phenyl] hexafluoropropane, 2,2-bis[4-(2,3-dicarboxyphenoxy) phenyl] hexafluoropropane, 2,2-bis[4-(3,4-dicarboxyphenoxy) phenyl] propane, 2,2-bis[4-(2,3-dicarboxyphenoxy) phenyl] propane, 2,2-bis[4-(3,4-dicarboxyphenoxy) phenyl] sulfone, and 2,2-bis[4-(3,4-dicarboxyphenoxy) phenyl] ether; various isomers of naphthalene or condensed polycyclic aromatic tetracarboxylic acid such as 1,2,5,6-naphthalene tetracarboxylic acid, 1,4,5,8-naphthalene tetracarboxylic acid, 2,3,6,7-naphthalene tetracarboxylic acid, 2,3,6,7-naphthalene tetracarboxylic acid, and 3,4,9,10-perylene tetracarboxylic acid; and bis(trimellitic acid monoester acid anhydride) compounds such as p-phenylene bis(trimellitic acid monoester acid anhydride), p-biphenylene bis(trimellitic acid monoester acid anhydride), ethylene bis(trimellitic acid monoester acid anhydride), and bisphenol A bis(trimellitic acid monoester acid anhydride). Examples of such aliphatic tetracarboxylic acid include chain aliphatic tetracarboxylic acid compounds such as butane tetracarboxylic acid; and alicyclic tetracarboxylic acid compounds such as cyclobutane tetracarboxylic acid, 1,2,3,4-cyclopentane tetracarboxylic acid, 1,2,4,5-cyclohexane tetracarboxylic acid, bicyclo[2.2.1.]heptane tetracarboxylic acid, bicyclo[3.3.1.] tetracarboxylic acid, bicyclo[3.1.1.]hept-2-ene tetracarboxylic acid, bicyclo[2.2.2.]octane tetracarboxylic acid, and adamantane tetracarboxylic acid.

These acids may be used as they are or in the form of an acid anhydride, active ester, or active amide. Two or more thereof may be used in combination.

The use of a tetracarboxylic acid containing a silicon atom such as dimethylsilane diphthalic acid and 1,3-bis(phthalic acid)tetramethyl disiloxane can serve to increase the adhesion to a support and the resistance to oxygen plasma used for cleaning and the like and to UV ozone processing. It is preferable that these tetracarboxylic acids containing a silicon atom account for 1 to 30 mol % of the total quantity of the acid components.

For the tetracarboxylic acids given above as examples, one or more of the hydrogen atoms contained in a tetracarboxylic acid residue may be replaced with a hydrocarbon group containing 1 to 10 carbon atoms such as methyl group and ethyl group; a fluoroalkyl group containing 1 to 10 carbon atoms such as trifluoromethyl group; or other groups such as F, Cl, Br, and I. Furthermore, if they are replaced with an acidic group such as OH, COOH, $SO_3H$, $CONH_2$, and $SO_2NH_2$, it is preferable in the case of the use as a photosensitive resin composition as described later because they serve to improve the solubility of the resin in an aqueous alkali solution.

V is preferably a tri- or higher-valent hydrocarbon group containing 80 or less carbon atoms and may be a tri- or higher-valent organic group containing 80 or less carbon atoms and including hydrogen and carbon as essential elements and one or more other atoms of elements selected from the group of boron, oxygen, sulfur, nitrogen, phosphorus, silicon, and halogens. For each of boron, oxygen, sulfur, nitrogen, phosphorus, silicon, and halogens, the number of atoms included is preferably in the range of 20 or less, more preferably in the range of 10 or less.

Y is preferably a divalent hydrocarbon group containing 80 or less carbon atoms and may be a divalent organic group containing 80 or less carbon atoms and including hydrogen and carbon as essential elements and one or more other atoms of elements selected from the group of boron, oxygen, sulfur, nitrogen, phosphorus, silicon, and halogens. For each of boron, oxygen, sulfur, nitrogen, phosphorus, silicon, and halogens, the number of atoms included is preferably in the range of 20 or less, more preferably in the range of 10 or less.

Examples of such a multivalent amine compound or diamine compound that give V or Y include the following. Examples of multivalent amine compounds and diamine compounds containing an aromatic ring include monocyclic aromatic diamine compounds such as m-phenylene diamine, p-phenylene diamine, and 3,5-diaminobenzoic acid; naphthalene or polycyclic aromatic diamine compounds such as 1,5-naphthalene diamine, 2,6-naphthalene diamine, 9,10-anthracene diamine, and 2,7-diaminofluorene; bis(diaminophenyl) compounds or various derivatives thereof such as 4,4'-diaminobenzanilide, 3,4'-diaminodiphenyl ether, 4,4'-diaminodiphenyl ether, 3-carboxy-4,4'-diaminodiphenyl ether, 3-sulfonic acid-4,4'-diaminodiphenyl ether, 3,4'-diaminodiphenyl methane, 4,4'-diaminodiphenyl methane, 3,4'-diaminodiphenyl sulfone, 4,4'-diaminodiphenyl sulfone, 3,4'-diaminodiphenyl sulfide, 4,4'-diaminodiphenyl sulfide, 4-aminobenzoic acid 4-aminophenyl ester, and 9,9-bis(4-aminophenyl) fluorene; 4,4'-diaminobiphenyl or various derivatives thereof such as 4,4'-diaminobiphenyl, 2,2'-dimethyl-4,4'-diaminobiphenyl, 2,2'-diethyl-4,4'-diaminobiphenyl, 3,3'-dimethyl-4,4'-diaminobiphenyl, 3,3'-diethyl-4,4'-diaminobiphenyl, 2,2',3,3'-tetramethyl-4,4'-diaminobiphenyl, 3,3',4,4'-tetramethyl-4,4'-diaminobiphenyl, and 2,2'-di(trifluoro methyl)-4,4'-diaminobiphenyl; bis(aminophenoxy) compounds such as bis(4-aminophenoxy phenyl) sulfone, bis(3-aminophenoxy phenyl) sulfone, bis(4-aminophenoxy) biphenyl, bis[4-(4-aminophenoxy) phenyl] ether, 2,2-bis[4-(4-aminophenoxy) phenyl] propane, 2,2-bis[4-(4-aminophenoxy) phenyl] hexafluoropropane, 1,4-bis(4-aminophenoxy) benzene, 1,3-bis(3-aminophenoxy) benzene, and 1,3-bis(4-aminophenoxy) benzene; bis(3-amino-4-hydroxyphenyl) compounds such as bis(3-amino-4-hydroxyphenyl) hexafluoropropane, bis(3-amino-4-hydroxyphenyl) sulfone, bis(3-amino-4-hydroxyphenyl) propane, bis(3-amino-4-hydroxyphenyl) methylene, bis(3-amino-4-hydroxyphenyl) ether, bis(3-amino-4-hydroxy) biphenyl, and 9,9-bis(3-amino-4-hydroxyphenyl) fluorene; bis(aminobenzoyl) compounds such as 2,2'-bis[N-(3-aminobenzoyl)-3-amino-4-hydroxyphenyl] hexafluoropropane, 2,2'-bis[N-(4-aminobenzoyl)-3-amino-4-hydroxyphenyl] hexafluoropropane, 2,2'-bis[N-(3-aminobenzoyl)-3-amino-4-hydroxyphenyl] propane, 2,2'-bis[N-(4-aminobenzoyl)-3-amino-4-hydroxyphenyl] propane, bis[N-(3-aminobenzoyl)-3-amino-4-hydroxyphenyl] sulfone, bis[N-(4-aminobenzoyl)-3-amino-4-hydroxyphenyl] sulfone, 9,9-bis[N-(3-aminobenzoyl)-3-amino-4-hydroxyphenyl] fluorene, 9,9-bis[N-(4-aminobenzoyl)-3-amino-4-hydroxyphenyl] fluorene, N, N'-bis(3-aminobenzoyl)-2,5-diamino-1,4-dihydroxy benzene, N, N'-bis(4-aminobenzoyl)-2,5-diamino-1,4-dihydroxy benzene, N, N'-bis(3-aminobenzoyl)-4,4'-diamino-3,3-dihydroxy biphenyl, N, N'-bis(4-aminobenzoyl)-4,4'-diamino-3,3-dihydroxy biphenyl, N, N'-bis(3-aminobenzoyl)-3,3'-diamino-4,4-dihydroxy biphenyl, and N, N'-bis(4-aminobenzoyl)-3,3'-diamino-4,4-dihydroxy biphenyl; heterocyclic containing diamine compounds such as 2-(4-aminophenyl)-5-aminobenzoxazole, 2-(3-aminophenyl)-5-aminobenzoxazole, 2-(4-aminophenyl)-6-aminobenzoxazole, 2-(3-aminophenyl)-6-aminobenzoxazole, 1,4-bis(5-amino-2-benzoxazolyl) benzene, 1,4-bis(6-amino-2-benzoxazolyl) benzene, 1,3-bis(5-amino-2-benzoxazolyl) benzene, 1,3-bis(6-amino-2-benzoxazolyl) benzene, 2,6-bis(4-aminophenyl) benzobisoxazole, 2,6-bis(3-aminophenyl) benzobisoxazole, 2,2'-bis[(3-aminophenyl)-5-benzoxazolyl] hexafluoropropane, 2,2'-bis[(4-aminophenyl)-5-benzoxazolyl] hexafluoropropane, bis[(3-aminophenyl)-5-benzoxazolyl], bis[(4-aminophenyl)-5-benzoxazolyl], bis[(3-aminophenyl)-6-benzoxazolyl], and bis[(4-aminophenyl)-6-benzoxazolyl]; aromatic triamine compounds such as 1,3,5-triamino benzene, tris(3-aminophenyl) methane, tris(4-aminophenyl) methane, tris(3-aminophenyl) amine, tris(4-aminophenyl) amine, tris(3-aminophenyl) benzene, tris(4-aminophenyl) benzene, 1,3,5-tris(3-aminophenoxy) benzene, 1,3,5-tris(4-aminophenoxy) benzene, 1,3,5-tris(4-aminophenoxy) triazine, melamine, and 2,4,6-triamino pyrimidine; aromatic tetraamine compounds such as 1,2,4,5-tetraaminobenzene, 3,3',4,4'-tetraaminobiphenyl, 3,3',4,4'-tetraaminodiphenyl sulfone, 3,3',4,4'-tetraaminodiphenyl sulfide, 2,3,6,7-tetraaminonaphthalene, and 1,2,5,6-tetraaminonaphthalene; and compounds produced from these multivalent amine compounds or diamine compounds by replacing one or more of the hydrogen atoms bonded to their aromatic rings with hydrocarbons or halogen atoms. Examples of aliphatic multivalent amine compounds include aliphatic diamine compounds such as ethylene diamine, propylene diamine, butane diamine, pentane diamine, hexane diamine, octane diamine, nonane diamine, decane diamine, undecane diamine, dodecane diamine, tetramethyl hexane diamine, 1,12-(4,9-dioxa) dodecane diamine, and 1,8-(3,6-dioxa) octane diamine; alicyclic diamine compounds such as cyclohexane diamine, 4,4'-methylene bis(cyclohexyl amine), and isophorone diamine; the polyoxyethylene amine and polyoxypropylene amine products under the trade name of Jeffamine (manufactured by Huntsman Corporation) and copolymer compounds thereof.

These multivalent amine compounds and diamine compounds may be used as they are or in the form of trimethylsilylated multivalent amine compounds or trimethylsilylated diamine compounds produced therefrom. Two or more thereof may be used in combination. For applications that require heat resistance, aromatic multivalent amine compounds or aromatic diamine compounds are preferably used in a quantity of 50 mol % or more of the total quantity of multivalent amine compounds or diamine compounds.

The use of a diamine compound containing silicon, such as 1,3-bis(3-aminopropyl)tetramethyl disiloxane and 1,3-bis (4-anilino)tetramethyl disiloxane, as the multivalent amine compound or diamine compound component can serve to increase the adhesion to the support and the resistance to oxygen plasma used for cleaning and the like and to UV ozone processing. These silicon-containing diamine compounds are preferably added to 1 to 30 mol % of the total quantity of the multivalent amine compound or diamine compound components.

For the multivalent amine compounds or diamine compounds given above as examples, one or more of the hydrogen atoms contained in the residue may be replaced with a hydrocarbon group containing 1 to 10 carbon atoms such as methyl group and ethyl group; a fluoroalkyl group containing 1 to 10 carbon atoms such as trifluoromethyl group; or other groups such as F, Cl, Br, and I. Furthermore, if they are replaced with an acidic group such as OH, COOH, $SO_3H$, $CONH_2$, and $SO_2NH_2$, it is preferable in the case of the use as a photosensitive resin composition as described later because they serve to improve the solubility of the resin in an aqueous alkali solution.

For the polyamic acid according to the present invention that contains a structure as represented by chemical formula (2) or chemical formula (3), the number of repetitions of the polyamic acid unit is preferably 5 or more, more preferably 10 or more. In addition, it is preferably 500 or less, more preferably 200 or less. If it is in this range, the molecular weight can be controlled in a preferable range. Form in chemical formula (2) and n in chemical formula (3), it is only necessary to meet the requirement for the preferable number of repetitions of the polyamic acid units according to the present invention. Accordingly, m and n are preferably 5 or more, more preferably 10 or more. In addition, it is preferably 500 or less, more preferably 200 or less.

Any structure in a polyamic acid as shown by chemical formula (1) can be detected by the following methods. For example, it can be detected by dissolving the polyamic acid in an acidic solution to decompose them into the multivalent amine compound or diamine compound and acid anhydride, i.e. the starting materials, and analyzing them by gas chromatography or NMR. Alternatively, it can also be detected by analyzing the polyamic acid directly by NMR, gas chromatography, or infrared absorption spectrometry.

For the present invention, a resin composition of polyamic acid can be prepared by mixing (a) the polyamic acid according to the present invention and (b) a solvent. The use of this resin composition makes it possible to produce polyimide film containing a polyimide that is formed by imidizing the polyamic acid included in the resin composition. Thus, the use of this resin composition as a varnish makes it possible to produce polyimide film on various supports as described later. Thus, polyimide film can be produced by preparing resin film containing a polyamic acid and then imidizing the polyamic acid. Solvents that can be used for this include aprotic polar solvents such as N-methyl-2-pyrolidone, γ-butyrolactone, N,N-dimethyl formamide, N,N-dimethyl acetamide, and dimethyl sulfoxide; ethers such as tetrahydrofuran, dioxane, propylene glycol monomethyl ether, propylene glycol monoethyl ether, diethylene glycol monomethyl ether, diethylene glycol monoethyl ether diethylene glycol ethyl methyl ether, and diethylene glycol dimethyl ether; ketones such as acetone, methyl ethyl ketone, diisobutyl ketone, diacetone alcohol, and cyclohexanone; esters such as ethyl acetate, propylene glycol monomethyl ether acetate, and ethyl lactate; and aromatic hydrocarbons such as toluene and xylene; which may be used singly or in combination.

A varnish with a low viscosity can be obtained even if it contains the polyamic acid according to the present invention at a high concentration. Accordingly, there are no specific limitations on the preferable content of the solvent, but it is preferably 50 parts by mass or more, more preferably 100 parts by mass or more, and preferably 2,000 parts by mass or less, more preferably 1,500 parts by mass or less, per 100 parts by mass of the resin of component (a). If it is in the range of 50 to 2,000 parts by mass, a viscosity suitable for coating can be ensured to allow easy production of a coat with an appropriately controlled thickness.

The polyamic acid according to the present invention has a polystyrene-based weight average molecular weight of preferably 100,000 or less, more preferably 80,000 or less, and still more preferably 50,000 or less, as determined by gel permeation chromatography. If it is in this range, an increase in viscosity of a varnish can be depressed more effectively even if the varnish has a high concentration. Furthermore, the weight average molecular weight is preferably 2,000 or more, more preferably 3,000 or more, and still more preferably 5,000 or more. If the weight average molecular weight is 2,000 or more, it is possible to avoid resulting in a varnish with an excessively low viscosity and ensure good coatability.

The resin composition according to the present invention can be converted into a photosensitive resin composition by adding a photoacid generating agent. The inclusion of a photoacid generating agent works to produce an acid in the irradiated portion so that the irradiated portion increases in solubility in an aqueous alkali solution, allowing a positive type relief pattern to be formed after dissolution of the irradiated portion. The inclusion of an epoxy compound or a thermal crosslinking agent as described later along with the photoacid generating agent allows the acid formed in the irradiated portion to serve for promotion of the crosslinking reaction of the epoxy compound and the thermal crosslinking agent, leading to the formation of a negative type relief pattern as a result of insolubilization of the irradiated portion.

Examples of such a photoacid generating agent include quinone diazide compounds, sulfonium salts, phosphonium salts, diazonium salts, and iodonium salts. Two or more thereof may be added to obtain a photosensitive resin composition with a high sensitivity.

Examples of such a quinone diazide compound include polyhydroxy compounds bonded to sulfonic acid of quinone diazide through ester linkage, polyamino compounds bonded to sulfonic acid of quinone diazide through sulfonamide linkage, and polyhydroxypolyamino compounds bonded to sulfonic acid of quinone diazide through ester linkage and/or sulfonamide linkage. It is preferable that 50 mol % or more of the functional groups in the polyhydroxy compounds and polyamino compounds be replaced with quinone diazide.

For the quinone diazide used for the present invention, both 5-naphthoquinone diazide sulfonyl group and 4-naphthoquinone diazide sulfonyl group are preferred. A 4-naphthoquinone diazide sulfonyl ester compound absorbs light in the i-line range of mercury lamps, and therefore, it is suitable for i-line light exposure. A 5-naphthoquinone diazide sulfonyl ester compound absorbs light in a region including the g-line of mercury lamps, and therefore, it is suitable for g-line light exposure. For the present invention, it is preferable to adopt either a 4-naphthoquinone diazide sulfonyl ester compound or a 5-naphthoquinone diazide sulfonyl ester compound depending on the wavelength of the light used for exposure. Furthermore, the agent may contain a naphthoquinone diazide sulfonyl ester compound having both a 4-naphthoquinone diazide sulfonyl group and a 5-naphthoquinone diazide sulfonyl group in one molecule, or the resin composition to be used may contain both a 4-naphthoquinone diazide sulfonyl ester compound and a 5-naphthoquinone diazide sulfonyl ester compound.

Of the examples of photoacid generating agents, the sulfonium salt, phosphonium salt, and diazonium salt are preferable because they can stabilize moderately the acid component produced by light exposure. The sulfonium salt is particularly preferable. In addition, a sensitizing agent and the like may also be contained as required.

For the present invention, the content of the photoacid generating agent is preferably 0.01 to 50 parts by mass per 100 parts by mass of the resin of component (a) from the viewpoint of increasing the sensitivity. Of these, the quinone diazide compound preferably accounts for 3 to 40 parts by mass. The total content of the sulfonium salt, phosphonium salt, and diazonium salt is preferably 0.5 to 20 parts by mass.

The photosensitive resin composition according to the present invention may contain a thermal crosslinking agent as shown by chemical formula (31) given below or a thermal crosslinking agent having a structure as shown by chemical formula (32) given below (hereinafter, both are referred to as thermal crosslinking agent). These thermal crosslinking agents can crosslink between resin compounds that fall under component (a) or with other additive components, thereby serving to produce polyimide film with enhanced chemical resistance and hardness.

[Chemical formula 10]

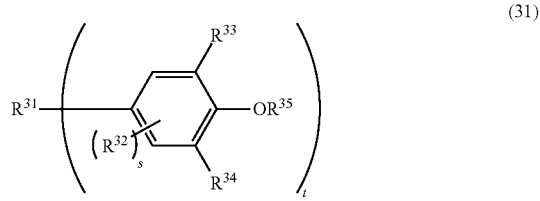

(31)

(In the above chemical formula (31), $R^{31}$ denotes a di- to tetra-valent linking group. $R^{32}$ denotes a monovalent hydrocarbon group containing 1 to 20 carbon atoms, Cl, Br, I, or F. $R^{33}$ and $R^{34}$ independently denote $CH_2OR^{36}$ (where $R^{36}$ is a hydrogen atom or a monovalent hydrocarbon containing 1 to 6 carbon atoms). $R^{35}$ is a hydrogen atom, methyl group, or ethyl group. Furthermore, s is an integer of 0 to 2, and t is an integer of 2 to 4. If a plurality of $R^{32}$s exist, they may be identical to or different from each other. If a plurality of $R^{33}$s and $R^{34}$s exist, they may be identical to or different from each other. If a plurality of $R^{35}$s exist, they may be identical to or different from each other. Examples of the linking group $R^{31}$ are listed below.)

[Chemical formula 11]

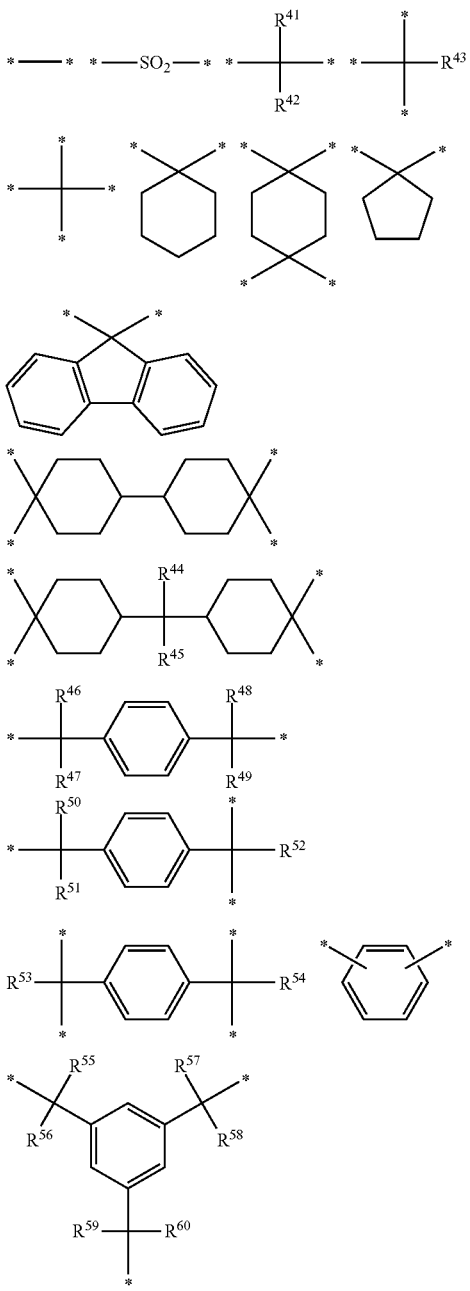

(In the above formula, $R^{41}$ to $R^{60}$ denote a hydrogen atom or a monovalent hydrocarbon group containing 1 to 20 carbon atoms in which one or more of the hydrogen atoms may be replaced with Cl, Br, I, or F.)

[Chemical formula 12]

(In the above chemical formula (32), $R^{37}$ denotes a hydrogen atom or a monovalent hydrocarbon containing carbon 1 to 6 atoms. Further, u denotes 1 or 2 and v denotes 0 or 1. Here, u+v is equal to 1 or 2)).

In the above formula (31), $R^{33}$ and $R^{34}$ denote $CH_2OR^{36}$ (where $R^{36}$ is a hydrogen atom or a monovalent hydrocarbon containing 1 to 6 carbon atoms) which is a thermally crosslinkable group. $R^{36}$ is preferably a monovalent hydrocarbon group containing 1 to 4 carbon atoms, more preferably a methyl group or ethyl group, to allow the thermal crosslinking agent of chemical formula (31) to maintain a moderate degree of reactivity and high storage stability.

Preferable examples of thermal crosslinking agents containing a structure as represented by chemical formula (31) are listed below.

[Chemical formula 13]

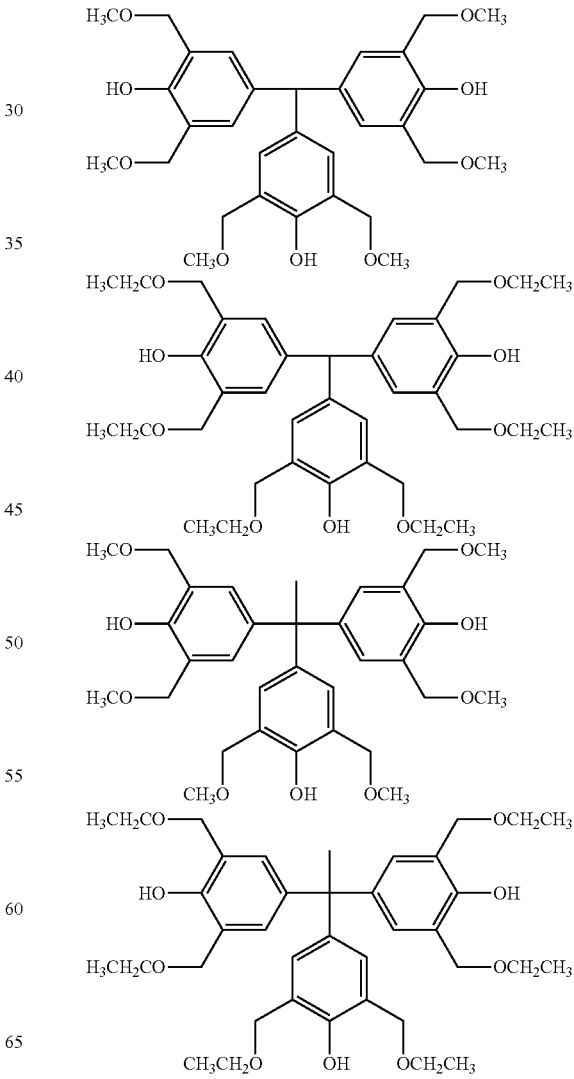

-continued

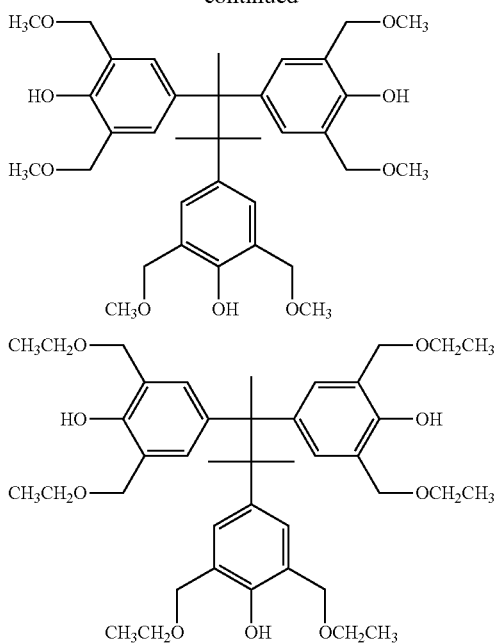

In chemical formula (32), $R^{37}$ denotes a hydrogen atom or a monovalent hydrocarbon group containing 1 to 6 carbon atoms, preferably a monovalent hydrocarbon group containing 1 to 4 carbon atoms. Furthermore, from the viewpoint of stability of the compound and storage stability of the resin composition, $R^{37}$ is preferably a methyl group or ethyl group and the compound preferably contains 8 or less ($CH_2OR^{37}$) groups.

Preferable examples of thermal crosslinking agents containing a group as represented by chemical formula (32) are listed below.

[Chemical formula 14]

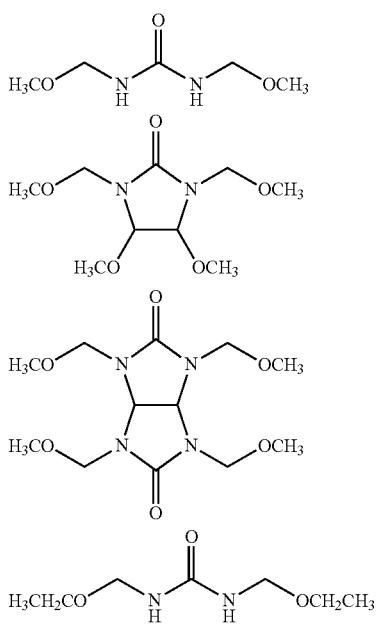

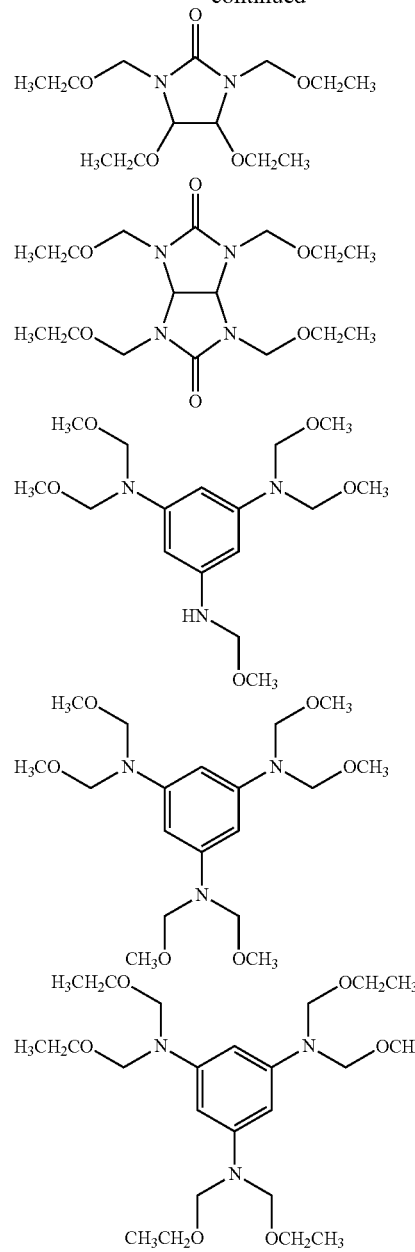

The content of the thermal crosslinking agent is preferably 10 parts by mass or more and 100 parts by mass or less per 100 parts by mass of the resin of component (a). If the content of the thermal crosslinking agent is 10 parts by mass or more and 100 parts by mass or less, a polyimide film with high strength and a photosensitive resin composition with high storage stability will be obtained.

The resin composition according to the present invention may further contain a thermal acid-forming agent. A thermal acid-forming agent works to generate an acid when heated after development as described later, promote the crosslinking reaction between the resin of component (a) and the thermal crosslinking agent, and also promote the cyclization of imide rings in the resin of component (a). This serves to provide polyimide film with an improved chemical resistance and a reduced film loss. The acid generated by the thermal acid-forming agent is preferably a strong acid, which is preferably an aryl sulfonic acid such as p-toluene sulfonic acid and benzene sulfonic acid or an alkyl sulfonic acid such as methane sulfonic acid, ethane sulfonic acid, and butane sulfonic acid. For the present invention, the thermal acid-forming agent is preferably an aliphatic sulfonic acid compound as represented by chemical formula (33) or (34), and two or more of such compounds may be contained.

[Chemical formula 15]

(33)

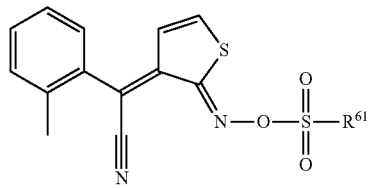

(34)

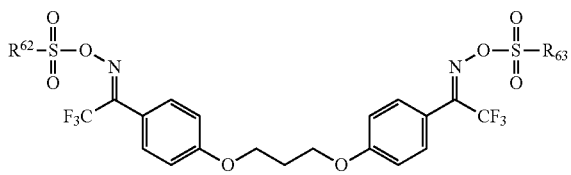

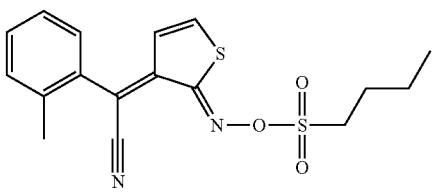

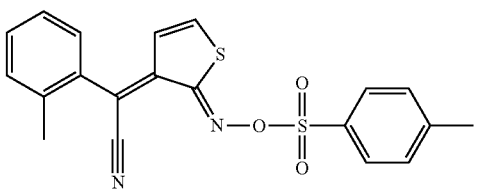

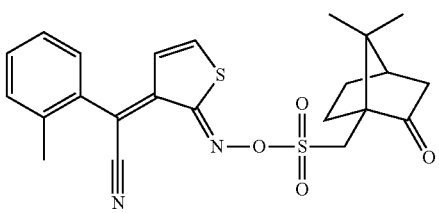

Specific examples of such compounds represented by chemical formula (34) are listed below.

[Chemical formula 17]

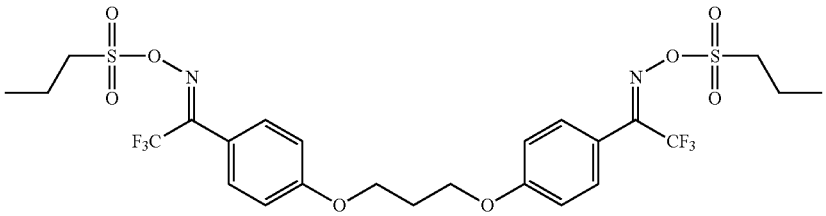

In the chemical formulae (33) and (34), $R^{61}$ to $R^{63}$ may be identical to or different from each other and may have an organic group containing 1 to 20 carbon atoms, which is preferably a hydrocarbon group containing carbon atoms 1 to 20. They may be an organic group containing 1 to 20 carbon atoms and including hydrogen and carbon as essential elements and one or more atoms of elements selected from the group of boron, oxygen, sulfur, nitrogen, phosphorus, silicon, and halogens.

Specific examples of such compounds represented by chemical formula (33) are listed below.

[Chemical formula 16]

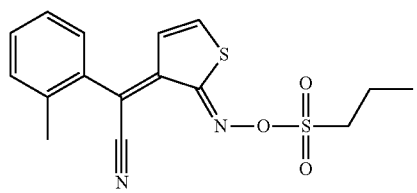

The content of the thermal acid-forming agent is preferably 0.5 part by mass or more and 10 parts by mass or less per 100 parts by mass of the resin of component (a) from the viewpoint of promoting the crosslinking reaction.

It may contain a compound having a phenolic hydroxyl group as required to help the alkaline developer in developing the photosensitive resin composition. Examples of such compounds with a phenolic hydroxyl group include, for example, the products available from Honshu Chemical Industry Co., Ltd., under the following trade names: Bis-Z, BisOC-Z, BisOPP-Z, BisP-CP, Bis26X-Z, BisOTBP-Z, BisOCHP-Z, BisOCR-CP, BisP-MZ, BisP-EZ, Bis26X-CP, BisP-PZ, BisP-IPZ, BisCR-IPZ, BisOCP-IPZ, BisOIPP-CP, Bis26X-IPZ, BisOTBP-CP, TekP-4HBPA (tetrakis P-DO-BPA), TrisP-HAP, TrisP-PA, TrisP-PHBA, TrisP-SA, TrisOCR-PA, BisOFP-Z, BisRS-2P, BisPG-26X, BisRS-3P, BisOC-OCHP, BisPC-OCHP, Bis25X-OCHP, Bis26X-OCHP, BisOCHP-OC, Bis236T-OCHP, methylenetris-FR-CR, BisRS-26X, and BisRS-OCHP; the products available from Asahi Organic Chemicals Industry Co., Ltd., under the following trade names: BIR-OC, BIP-PC, BIR-PC, BIR-PTBP, BIR-PCHP, BIP-BIOC-F, 4PC, BIR-BIPC-F, and TEP-BIP-A; and others including 1,4-dihydroxy naphthalene, 1,5-dihydroxy naphthalene, 1,6-dihydroxy naphthalene, 1,7-dihydroxy naphthalene, 2,3-dihydroxy naphthalene, 2,6-dihydroxy naphthalene, 2,7-dihydroxy naphthalene, 2,4-dihydroxy quinoline, 2,6-dihydroxy quinoline, 2,3-dihydroxy quinoxaline, anthracene-1,2,10-triol, anthracene-1,8,9-triol, and 8-quinolinol. If such a compound with a phenolic hydroxyl group is contained, the resulting photosensitive resin composition will be scarcely dissolved in an alkaline developer before exposure, but will be easily dissolved in an alkaline developer after exposure, leading to a decreased film loss during development and ensuring rapid and easy development. Accordingly, the sensitivity will improve easily.

Such a compound with a phenolic hydroxyl group preferably accounts for 3 parts by mass or more and 40 parts by mass or less per 100 parts by mass of the resin of component (a).

The photosensitive resin composition according to the present invention may contain a contact improving agent. Examples of such contact improving agents include silane coupling agents such as vinyl trimethoxysilane, vinyl triethoxysilane, epoxy cyclohexyl ethyl trimethoxysilane, 3-glycidoxy propyl trimethoxysilane, 3-glycidoxy propyl triethoxysilane, p-styryl trimethoxysilane, 3-aminopropyl trimethoxysilane, 3-aminopropyl triethoxysilane, and N-phenyl-3-aminopropyl trimethoxysilane, as well as titanium chelate agents and aluminum chelate agents. There are others including alkoxysilane-containing aromatic amine compounds and alkoxysilane-containing aromatic amide compounds as listed below.

[Chemical formula 18]

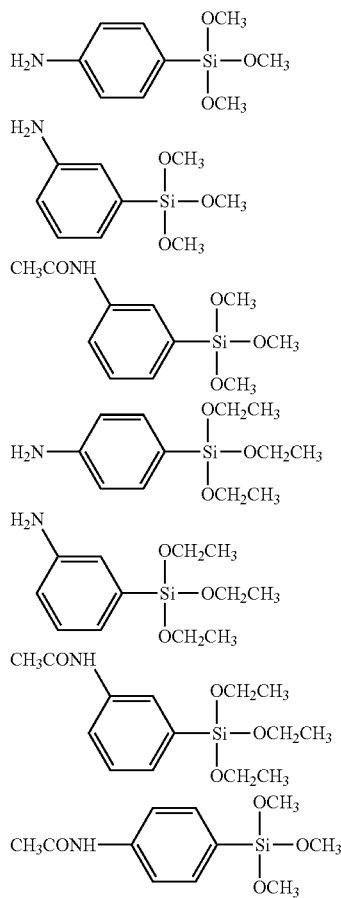

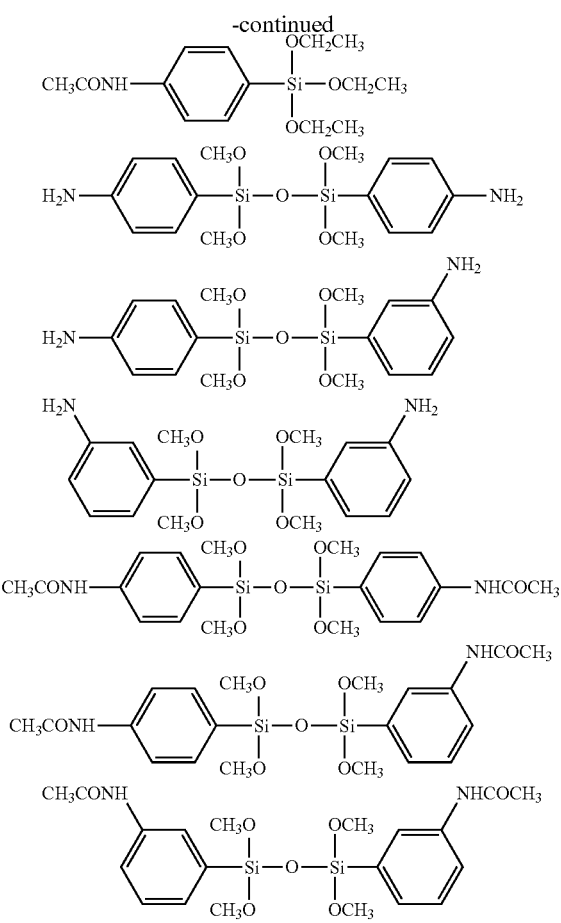

Besides, compounds produced through a reaction between an aromatic amine compound and an alkoxy-containing silicon compound can also be used. Such compounds include, for example, those produced by reacting an aromatic amine compound with an alkoxysilane compound having a group reactive with an amino group such as epoxy group and chloromethyl group. Two or more of the above contact improving agents may be contained. If these contact improving agents are contained, the photosensitive resin film can come in stronger contact with the substrate material such as silicon wafer, ITO, $SiO_2$, and nitride silicon during the development step. Besides, improved contact between the polyimide film and the substrate material can increase the resistance to oxygen plasma and UV ozone treatment performed for cleaning. The content of the contact improving agent is preferably 0.01 to 10 parts by mass per 100 parts by mass of the resin of component (a).

The resin composition according to the present invention may contain inorganic particles with the aim of improving the heat resistance. Materials of inorganic particles used for this aim include metals such as platinum, gold, palladium, silver, copper, nickel, zinc, aluminum, iron, cobalt, rhodium, ruthenium, tin, lead, bismuth, and tungsten and metal oxides such as silicon oxide (silica), titanium oxide, aluminum oxide, zinc oxide, tin oxide, tungsten oxide, zirconium oxide, calcium carbonate, and barium sulfate. There are no specific limitations on the shape of these inorganic particles, and they may be spherical, elliptic, flattened, rod-like, or fibrous. To prevent an increase in the surface roughness of the polyimide film of a resin composition containing these inorganic particles, the average particle diameter of the inorganic particles is preferably 1 nm or more and 100 nm or less, more preferably 1 nm or more and 50 nm or less, and still more preferably 1 nm or more and 30 nm or less.

The content of the inorganic particles is preferably 3 parts by mass or more, more preferably 5 parts by mass or more, and still more preferably 10 parts by mass or more, and preferably 100 parts by mass or less, more preferably 80 parts by mass or less, and still more preferably 50 parts by mass or less, per 100 parts by mass of the resin of component (a). The heat resistance will be sufficiently high if the content of the inorganic particles is 3 parts by mass or more, and the polyimide film will have sufficiently high toughness if it is 100 parts by mass or less.

The polyamic acid resin composition according to the present invention may contain a surface active agent in order to improve the coatability. Useful surface active agents include fluorochemical surface active agents such as Fluorad (registered trademark) manufactured by Sumitomo 3M, Megafac (registered trademark) manufactured by DIC, Surflon (registered trademark) manufactured by Asahi Glass Co., Ltd.; organic siloxane surface active agents such as KP341 manufactured by Shin-Etsu Chemical Co., Ltd. DBE manufactured by Chisso Corporation, Polyflow (registered trademark) and Glanol (registered trademark) manufactured by Kyoeisha Chemical Co., Ltd., and BYK manufactured by BYK-Chemie; and acrylic polymer surface active agents such as Polyflow manufactured by Kyoeisha Chemical Co., Ltd. The content of the surface active agent is preferably 0.01 to 10 parts by mass per 100 parts by mass of the resin of component (a).

Described below is the production method for the polyamic acid according to the present invention. Polyamic acid can be produced by reacting either a multivalent amine compound or a diamine compound with either tetracarboxylic acid or a derivative thereof, and the polyamic acid according to the present invention that has a structure as shown by chemical formula (1) is preferably produced by reacting either (i) a multivalent amine compound or diamine compound that can serve as starting materials for producing polyamic acid or (ii) an amino group derived from a multivalent amine compound or diamine compound after the production of polyamic acid, with a compound that reacts with an amino group to form a structure as shown by the above-mentioned chemical formula (1).

Specifically, the following three methods can be applied favorably.

(i-1) A production method including a step for reacting the amino group of a multivalent amine compound containing 3 or more primary amino groups with a compound that reacts with the amino group to form a structure as shown by the above-mentioned chemical formula (1) to form a multivalent amine derivative containing 2 or more primary amino groups and a structure as shown by chemical formula (1) and a step for polymerizing the multivalent amine derivative and tetracarboxylic acid or a derivative thereof.

(i-2) A production method including a step for reacting the amino group of a diamine compound with a compound that reacts with the amino group to form a structure as shown by the above-mentioned chemical formula (1) to form a diamine derivative containing a primary amino group and a structure as shown by chemical formula (1) and a step for polymerizing the diamine derivative and tetracarboxylic acid or a derivative thereof.

(ii) A production method including a step for polymerizing a diamine compound and tetracarboxylic acid or a derivative thereof to produce polyamic acid having an amino group at a chain end and a step for reacting the amino group of the polyamic acid with a compound that reacts with an amino group to form a structure as represented by chemical formula (1), to thereby produce a polyamic acid having a structure as shown by chemical formula (1).

For these production method, examples of the compound that reacts with an amino group to form a structure as shown by chemical formula (1) include diketene, β-keto acid, β-thioketo acid, β-ketimino acid, α-sulfinyl carboxylic acid, α-sulfonyl carboxylic acid, α-phosphinoyl carboxylic acid, α-nitro carboxylic acid, α-cyano carboxylic acid, and derivatives thereof. More specifically, such compounds include diketene, acetoacetic acid, thioketene dimers, 1,2-benzo isoxazole-3-acetic acid, methane sulfinyl acetic acid, methane sulfonyl acetic acid, 2-(p-toluenesulfonyl) acetic acid, diphenyl phosphinoyl acetic acid, nitro acetic acid, and cyanoacetic acid. Of these, diketene, acetoacetic acid, 2-(p-toluenesulfonyl) acetic acid, and cyano acetic acid are preferable.

Useful reaction solvents include aprotic polar solvents such as N-methyl-2-pyrolidone, γ-butyrolactone, N,N-dimethyl formamide, N,N-dimethyl acetamide, and dimethyl sulfoxide; ethers such as tetrahydrofuran, dioxane, propylene glycol monomethyl ether, propylene glycol monoethyl ether, diethylene glycol monomethyl ether, diethylene glycol monoethyl ether diethylene glycol ethyl methyl ether, and diethylene glycol dimethyl ether; ketones such as acetone, methyl ethyl ketone, diisobutyl ketone, diacetone alcohol, and cyclohexanone; esters such as ethyl acetate, propylene glycol monomethyl ether acetate, and ethyl lactate; and aromatic hydrocarbons such as toluene, xylene, which may be used singly or in combination with one or more thereof. Furthermore, if the same solvent as solvent (b) contained in the resin composition according to the present invention is used, the intended resin composition can be obtained without isolating the resin after production.

Moreover, the carboxyl group in the polyamic acid according to the present invention may be esterified with a hydrocarbon group containing 1 to 10 carbon atoms or an alkyl silyl group containing 1 to 10 carbon atoms.

Described below is the production method for the resin composition according to the present invention. For example, a resin composition can be produced by dissolving components (a) and (b) described above, along with a photoacid generating agent, dissolution adjusting agent, contact improving agent, inorganic particles, surface active agent, etc., as required. This dissolution can be carried out by stirring, heating, etc. If a photoacid generating agent is contained, an appropriate heating temperature is adopted in a range, commonly from room temperature to 80° C., where a photosensitive resin composition with unimpaired performance is obtained. There are no specific limitations on the order of dissolving these components, and for example, the compound with the lowest solubility may be dissolved first followed by others in the order of solubility. Alternatively, the dissolution of those components that are likely to form bubbles when dissolved by stirring, such as surface active agents and some contact improving agents, may be postponed to the dissolution of the other components so that the dissolution of the latter will not be hindered by bubble formation.

The resulting resin composition is preferably filtrated through a filter to remove dust and particles. Filters with a pore size of, for example, 10 μm, 3 μm, 1 μm, 0.5 μm, 0.2 μm, 0.1 μm, 0.07 μm, or 0.05 μm are available, though there are no specific limitations on the size. The filter to be used for filtration may be of such a material as polypropylene (PP), polyethylene (PE), nylon (NY), and polytetrafluoroethylene (PTFE), of which polyethylene and nylon are preferable.

Described next is the production method for resin film containing polyamic acid produced from the resin composition according to the present invention. First, the resin composition according to the present invention is spread over a support. There are no specific limitations on the support, and useful ones include wafer substrates of silicon, gallium arsenide, or the like; glass substrates of sapphire glass, soda lime glass, alkali-free glass, or the like; metal substrates of stainless steel, copper, or the like, and others such as metal foil and ceramics substrate. Useful resin composition coating methods include spin coating, slit coating, dip coating, spray coating, and printing, which may be used in combination. Before the coating step, the support may be pre-treated with a contact improving agent as described above. For example, a contact improving agent may be dissolved to 0.5 to 20 wt % in a solvent such as isopropanol, ethanol, methanol, water, tetrahydrofuran, propylene glycol monomethyl ether acetate, propylene glycol monomethyl ether, ethyl lactate, and diethyl adipate to prepare a solution, which is then used to treat the support surface by an appropriate technique such as spin coating, slit die coating, bar coating, dip coating, spray coating, and steam processing. Vacuum drying may be carried out as required, followed by heat treatment at 50° C. to 300° C. to accelerate the reaction between the support and the contact improving agent. In general, the coating step is followed by drying the coating film of the resin composition to form resin film containing polyamic acid. Useful drying methods include reduced pressure drying methods, thermal drying methods, and combinations thereof. The reduced pressure drying methods include, for example, a process in which a support with a coating film formed on its surface is put in a vacuum chamber, followed by reducing the pressure in the vacuum chamber. Thermal drying is performed by using a tool such as hot plate, oven, and infrared ray. When using a hot plate, the coating film is put directly on the plate or held on jigs such as proxy pins fixed on the plate while being dried by heating. There are various proxy pins of different materials including metals such as aluminum and stainless steel and synthetic resins such as polyimide resin and Teflon (registered trademark), but any types of proxy pins may work effectively if they have heat resistance. An appropriate proxy pin height may be adopted depending on the support size, type of the solvent used in the polyamic acid resin composition, drying method used, etc., but it is preferably about 0.1 to 10 mm. Depending on the type and purpose of the solvent used in the polyamic acid resin composition, heating is performed preferably at a temperature in the range of room temperature to 180° C. for 1 minute to several hours.

When the resin composition according to the present invention contains a photoacid generating agent, a pattern can be formed by processing the dried coat film by the method described below. An actinic ray is applied to the coating film through a mask of an intended pattern. Actinic rays available for exposure include ultraviolet ray, visible light, electron beam, and X-ray, and the i-line (365 nm), h-line (405 nm), and g-line (436 nm) of a mercury lamp are preferred for the invention. If the film is positively photosensitive, the exposed parts are dissolved by a developer. If the film is negatively photosensitive, the exposed parts harden and become insoluble in a developer.

After the exposure step, a developer is used to remove the exposed parts of a positive film or unexposed parts of a negative film to form an intended pattern. Regardless of whether the film is positive or negative, preferable developers include an aqueous solution of alkaline compounds such as tetramethyl ammonium, diethanol amine, diethyl aminoethanol, sodium hydroxide, potassium hydroxide, sodium carbonate, potassium carbonate, trimethyl amine, diethyl amine, methyl amine, dimethyl amine, dimethylaminoethyl acetate, dimethyl aminoethanol, dimethylaminoethyl methacrylate, cyclohexyl amine, ethylene diamine, and hexamethylene diamine. In some cases, polar solvents such as N-methyl-2-pyrolidone, N,N-dimethyl formamide, N,N-dimethyl acetamide, dimethyl sulfoxide, γ-butyrolactone, and dimethyl acrylamide; alcohols such as methanol, ethanol and isopropanol; esters such as ethyl lactate and propylene glycol monomethyl ether acetate; and ketones such as cyclopentanone, cyclohexaone, isobutyl ketone, and methyl isobutyl ketone may be added singly or in combination to these aqueous alkali solution. For negative films, it is also possible to use a polar solvent as give above that contains no aqueous alkali solution, or an alcohol, ester, or ketone, which may be added singly or in combination. Commonly, rinsing in water is performed after the development step. Here again, the water used for rinsing may contain an alcohol such as ethanol and isopropyl alcohol, and an ester such as ethyl lactate and propylene glycol monomethyl ether acetate.

Finally, heat treatment is performed in the range of 180° C. or more and 600° C. or less to cure the coating film. The polyamic acid contained in the resin film that contains polyamic acid is imidized during this curing step to produce polyimide film. Such polyimide film produced through the imidization step can be used favorably as material for surface protect film and interlayer insulation film of semiconductor elements, insulation layers and spacer layers of organic electroluminescent elements (organic EL elements), planarizing film of thin film transistor substrates, insulation layers of organic transistors, flexible printed boards, substrates for flexible display, substrates for flexible electronic paper, substrates for flexible solar batteries, substrates for flexible color filters, binders for electrodes of lithium ion secondary batteries, and adhesives for semiconductors.

EXAMPLES

The present invention will be illustrated below in greater detail with reference to Examples, but it should be understood that the invention is not construed as being limited thereto. With respect to the number of measurements n, n=1 unless otherwise specified.

(1) Measurement of Viscosity

A varnish was dissolved in N-methyl-2-pyrolidone to prepare a 10 mass % solution and measurement was performed at 25° C. using a viscometer (TVE-22H, manufactured by Toki Sangyo Co., Ltd.).

(2) Measurement of Weight Average Molecular Weight

The polystyrene-based weight average molecular weight was measured using a gel permeation chromatograph (Waters 2690, manufactured by Nihon Waters K. K.). TOSOH TXK-GEL α-2500 and α-4000 columns manufactured by Tosoh Corporation were used along with a N-methyl-2-pyrolidone moving layer.

(3) Production of Polyimide Film

A varnish was subjected to filtration under pressure using a 1 μm filter to remove foreign objects. Using a coater-developer apparatus Mark-7 (manufactured by Tokyo Electron Ltd.), spin coating was performed on a 6-inch silicon wafer in such a way that the film thickness after pre-baking at 140° C. for 4 minutes would be 15 μm, and then such pre-baking was carried out. The pre-baked film was heat-treated at 350° C. for 30 minutes in a nitrogen air flow (oxygen concentration 20 μm or less) in an inert gas oven (INH-21CD, manufactured by Koyo Thermo Systems Co., Ltd.) to produce polyimide film. Subsequently, the polyimide film was separated from the silicon wafer substrate by immersion in hydrofluoric acid for 4 minutes and then it was air-dried. The polyimide film thus obtained was used for measurement in paragraphs (4) to (7).

(4) Measurement of Ultimate Tensile Elongation, Ultimate Tensile Stress, Young's Modulus Measurements were made using a Tensilon universal testing machine (RTM-100, manufactured by Orientec Co., Ltd.) according to Japanese Industrial Standard (JIS K 7127: 1999).

Measuring conditions were as follows: width of test piece 10 mm, chuck interval 50 mm, test speed 50 mm/min, number of measurements n=10.

(5) Measurement of Glass Transition Temperature (Tg)

Measurements were made in a nitrogen air flow using a thermomechanical analysis apparatus (EXSTAR6000 TMA/SS6100, manufactured by SII NanoTechnology Inc.) Heating was performed under the following conditions. A specimen was heated up to 200° C. in the first stage to remove adsorbed water and cooled to room temperature in the second stage. In the third stage, measurements were made at a heating rate of 5° C./min to determine the glass transition temperature.

(6) Measurement of Coefficient of Thermal Expansion (CTE)

Measurements were made using the same apparatus and under the same conditions as used for the measurement of glass transition temperature to determine the average coefficient of linear expansion in the range of 50 to 200° C.

(7) Measurement of 5% Mass Decrease Temperature (Td5)

A thermal mass measuring apparatus (TGA-50, manufactured by Shimadzu Corporation) was used to make measurements in a nitrogen air flow. Heating was performed under the following conditions. A specimen was heated up to 150° C. in the first stage to remove adsorbed water and cooled to room temperature in the second stage. In the third stage, measurements were made at a heating rate of 10° C./min to determine the 5% mass decrease temperature.

(8) Measurement of $^1$H-NMR

A magnetic nuclear resonance apparatus (EX-270, manufactured by JEOL Ltd.) was used along with deuterated dimethyl sulfoxide as deuterated solvent to measure the $^1$H-NMR spectrum Listed below are abbreviations of the compounds used in Synthesis examples, Examples, and Comparative examples.
CHDA: trans-1,4-cyclohexane diamine
DAE: 4,4'-diaminodiphenyl ether
PDA: p-phenylene diamine
BPDA: 3,3',4,4'-biphenyl tetracarboxylic dianhydride
ODPA: bis(3,4-dicarboxyphenyl) ether dianhydride
PMDA: pyromellitic dianhydride
TAM: tris(4-aminophenyl) methane
TAB: 1,3,5-tris(4-aminophenoxy) benzene
TsAcOH: 2-(p-toluenesulfonyl) acetic acid
DIBOC: di-tert-butyl dicarbonate
MA: maleic anhydride
NMP: N-methyl-2-pyrolidone Example 1

A thermometer and a stirring rod equipped with stirring blades were fitted on a 200 mL four-necked flask. Then, 75 g of NMP was added under a dry nitrogen flow. Subsequently, while stirring was continued at room temperature, 10.01 g (50.00 mmol) of DAE was added and washing was performed with 10 g of NMP. After confirming the dissolution of DAE, the solution was cooled to 10° C. or below. After the cooling, a solution of 0.210 g (2.50 mmol) of diketene diluted with 5 g of NMP was added by pouring over a period of 1 minute and washing was performed with 5 g of NMP. After the addition, the solution was heated to 40° C. After the heating, 10.91 g (50.00 mmol) of PMDA was added and washing was performed with 10 g of NMP. After 2 hours, the solution was cooled to provide a varnish.

Example 2

A thermometer and a stirring rod equipped with stirring blades were fitted on a 200 mL four-necked flask. Then, 55 g of NMP was added under a dry nitrogen flow. Subsequently, while stirring was continued at room temperature, 12.01 g (60.00 mmol) of DAE was added and washing was performed with 10 g of NMP. After confirming the dissolution of DAE, the solution was cooled to 10° C. or below. After the cooling, a solution of 0.504 g (6.00 mmol) of diketene diluted with 5 g of NMP was added by pouring over a period of 1 minute and washing was performed with 5 g of NMP. After the addition, the solution was heated to 40° C. After the heating, 13.09 g (60.00 mmol) of PMDA was added and washing was performed with 10 g of NMP. After 2 hours, the solution was cooled to provide a varnish.

Example 3

A thermometer and a stirring rod equipped with stirring blades were fitted on a 200 mL four-necked flask. Then, 45 g of NMP was added under a dry nitrogen flow. Subsequently, while stirring was continued at room temperature, 12.01 g (60.00 mmol) of DAE was added and washing was performed with 10 g of NMP. After confirming the dissolution of DAE, the solution was cooled to 10° C. or below. After the cooling, a solution of 0.757 g (9.00 mmol) of diketene diluted with 5 g of NMP was added by pouring over a period of 1 minute and washing was performed with 5 g of NMP. After the addition, the solution was heated to 40° C. After the heating, 13.09 g (60.00 mmol) of PMDA was added and washing was performed with 10 g of NMP. After 2 hours, the solution was cooled to provide a varnish.

Example 4

A thermometer and a stirring rod equipped with stirring blades were fitted on a 200 mL four-necked flask. Then, 65 g of NMP was added under a dry nitrogen flow. Subsequently, while stirring was continued at room temperature, 12.01 g (60.00 mmol) of DAE was added and washing was performed with 10 g of NMP. After confirming the dissolution of DAE, the solution was cooled to 10° C. or below. After the cooling, a solution of 0.504 g (6.00 mmol) of diketene diluted with 5 g of NMP was added by pouring over a period of 1 minute and washing was performed with 5 g of NMP. After the addition, the solution was heated to 40° C. After the heating, 12.43 g (57.00 mmol) of PMDA was added and washing was performed with 10 g of NMP. After 2 hours, the solution was cooled to provide a varnish.

Example 5

A thermometer and a stirring rod equipped with stirring blades were fitted on a 200 mL four-necked flask. Then, 65 g of NMP was added under a dry nitrogen flow, and the temperature was elevated to 40° C. After the temperature elevation, while stirring was continued at room temperature, 12.01 g (60.00 mmol) of DAE was added and washing was performed with 10 g of NMP. After confirming the dissolution of DAE, 12.43 g (57.00 mmol) of PMDA was added and washing was performed with 10 g of NMP. After 2 hours, a solution of 0.504 g (6.00 mmol) of diketene diluted with 5 g of NMP was added by pouring over a period of 1 minute and washing was performed with 5 g of NMP. After 1 hour, the solution was cooled to provide a varnish.

Example 6

A thermometer and a stirring rod equipped with stirring blades were fitted on a 200 mL four-necked flask. Then, 65 g of NMP was added under a dry nitrogen flow. Subsequently, while stirring was continued at room temperature, 6.488 g (60.00 mmol) of PDA was added and washing was performed with 10 g of NMP, followed by elevating the temperature to 30° C. After confirming the dissolution of PDA, a solution of 0.504 g (6.00 mmol) of diketene diluted with 5 g of NMP was added by pouring over a period of 1 minute and washing was performed with 5 g of NMP. After the addition, the solution was heated to 60° C. After the heating, 17.65 g (60.00 mmol) of BPDA was added and washing was performed with 10 g of NMP. After 4 hours, the solution was cooled to provide a varnish.

Example 7

A thermometer and a stirring rod equipped with stirring blades were fitted on a 200 mL four-necked flask. Then, 45 g of NMP was added under a dry nitrogen flow. Subsequently, while stirring was continued at room temperature, 5.710 g (50.00 mmol) of CHDA was added and washing was performed with 10 g of NMP. After confirming the dissolution of CHDA, the solution was cooled to 10° C. or below. After the cooling, a solution of 0.420 g (5.00 mmol) of diketene diluted with 5 g of NMP was added by pouring over a period of 1 minute and washing was performed with 5 g of NMP. After the addition, the solution was heated to 60° C. After the heating, 10.30 g (35.00 mmol) of BPDA and 4.653 g (15.00 mmol) of ODPA were added and washing was performed with 10 g of NMP. After 4 hours, the solution was cooled to provide a varnish.

Example 8

A thermometer and a stirring rod equipped with stirring blades were fitted on a 200 mL four-necked flask. Then, 35 g of NMP was added under a dry nitrogen flow. Subsequently, while stirring was continued at room temperature, 1.157 g (4 mmol) of TAM was added and washing was performed with 10 g of NMP. After confirming the dissolution of TAM, the solution was cooled to 10° C. or below. After the cooling, a solution of 0.504 g (6.00 mmol) of diketene diluted with 5 g of NMP was added by pouring over a period of 1 minute and washing was performed with 5 g of NMP. After the addition, the solution was heated to 40° C. After the heating, 6.808 g (34.00 mmol) of DAE was added and washing was performed with 10 g of NMP. Subsequently, 8.725 g (40.00 mmol) of PMDA was added and washing was performed with 10 g of NMP. After 2 hours, the solution was cooled to provide a varnish.

Example 9

A thermometer and a stirring rod equipped with stirring blades were fitted on a 200 mL four-necked flask. Then, 35 g of NMP was added under a dry nitrogen flow. Subsequently, while stirring was continued at room temperature, 1.598 g (4 mmol) of TAB was added and washing was performed with 10 g of NMP. After confirming the dissolution of TAB, the solution was cooled to 10° C. or below. After the cooling, a solution of 0.504 g (6.00 mmol) of diketene diluted with 5 g of NMP was added by pouring over a period of 1 minute and washing was performed with 5 g of NMP. After the addition, the solution was heated to 40° C. After the heating, 6.808 g (34.00 mmol) of DAE was added and washing was performed with 10 g of NMP. Subsequently, 8.725 g (40.00 mmol) of PMDA was added and washing was performed with 10 g of NMP. After 2 hours, the solution was cooled to provide a varnish.

Example 10

A thermometer and a stirring rod equipped with stirring blades were fitted on a 200 mL four-necked flask. Then, 35 g of NMP was added under a dry nitrogen flow. Subsequently, while stirring was continued at room temperature, 0.425 g (5 mmol) of cyanoacetic acid was added and washing was performed with 10 g of NMP. After confirming the dissolution of cyanoacetic acid, the solution was cooled to 10° C. or below. After the cooling, 0.851 g (5.25 mmol) of carbonyl diimidazole was added and washing was performed with 10 g of NMP. After the addition, stirring was continued overnight at room temperature. On the next day, 10.01 g (50.00 mmol) of DAE was added and washing was performed with 10 g of NMP. After the addition, stirring was additionally continued overnight at room temperature. On the next day, after elevating the temperature to 40° C., 10.91 g (50.00 mmol) of PMDA was added and washing was performed with 30 g of NMP. After 2 hours, the solution was cooled to provide a varnish.

Example 11

A thermometer and a stirring rod equipped with stirring blades were fitted on a 200 mL four-necked flask. Then, 35 g of NMP was added under a dry nitrogen flow. Subsequently, while stirring was continued at room temperature, 1.071 g (5 mmol) of TsAcOH was added and washing was performed with 10 g of NMP. After confirming the dissolution of TsAcOH, the solution was cooled to 10° C. or below. After the cooling, 0.851 g (5.25 mmol) of carbonyl diimidazole was added and washing was performed with 10 g of NMP. After the addition, stirring was continued overnight at room temperature. On the next day, 10.01 g (50.00 mmol) of DAE was added and washing was performed with 10 g of NMP. After the addition, stirring was additionally continued overnight at room temperature. On the next day, after elevating the temperature to 40° C., 10.91 g (50.00 mmol) of PMDA was added and washing was performed with 30 g of NMP. After 2 hours, the solution was cooled to provide a varnish.

Comparative Example 1

A thermometer and a stirring rod equipped with stirring blades were fitted on a 200 mL four-necked flask. Then, 85 g of NMP was added under a dry nitrogen flow, and the temperature was elevated to 40° C. After the temperature elevation, while stirring is continued at room temperature, 6.007 g (30.00 mmol) of DAE was added and washing was performed with 10 g of NMP. After confirming the dissolution of DAE, 6.544 g (30.00 mmol) of PMDA was added and washing was performed with 10 g of NMP. After 2 hours, the solution was cooled to provide a varnish.

Comparative Example 2

A thermometer and a stirring rod equipped with stirring blades were fitted on a 200 mL four-necked flask. Then, 85 g of NMP was added under a dry nitrogen flow, and the temperature was elevated to 40° C. After the temperature elevation, while stirring is continued at room temperature, 11.41 g (57.00 mmol) of DAE was added and washing was performed with 10 g of NMP. After confirming the dissolution of DAE, 13.09 g (60.00 mmol) of PMDA was added and washing was performed with 10 g of NMP. After 2 hours, the solution was cooled to provide a varnish.

Comparative Example 3

A thermometer and a stirring rod equipped with stirring blades were fitted on a 200 mL four-necked flask. Then, 85 g of NMP was added under a dry nitrogen flow, and the temperature was elevated to 40° C. After the temperature elevation, while stirring is continued at room temperature, 12.01 g (60.00 mmol) of DAE was added and washing was performed with 10 g of NMP. After confirming the dissolution of DAE, 12.43 g (57.00 mmol) of PMDA was added and washing was performed with 10 g of NMP. After 2 hours, the solution was cooled to provide a varnish.

Comparative Example 4

A thermometer and a stirring rod equipped with stirring blades were fitted on a 200 mL four-necked flask. Then, 60 g of NMP was added under a dry nitrogen flow. Subsequently, while stirring is continued at room temperature, 12.01 g (60.00 mmol) of DAE was added and washing was performed with 10 g of NMP. After confirming the dissolution of DAE, the solution was cooled to 10° C. or below. After the cooling, a solution of 1.31 g (6.00 mmol) of DIBOC diluted with 5 g of NMP was added by pouring over a period of 1 minute and washing was performed with 5 g of NMP. After the addition, the solution was heated to 40° C. After the heating, 12.43 g (57.00 mmol) of PMDA was added and washing was performed with 10 g of NMP. After 2 hours, the solution was cooled to provide a varnish.

Comparative Example 5

A thermometer and a stirring rod equipped with stirring blades were fitted on a 200 mL four-necked flask. Then, 60 g of NMP was added under a dry nitrogen flow. Subsequently, while stirring is continued at room temperature, 12.01 g (60.00 mmol) of DAE was added and washing was performed with 10 g of NMP. After confirming the dissolution of DAE, the solution was cooled to 10° C. or below. After the heating, 0.588 g (6.00 mmol) of MA was added and washing was performed with 10 g of NMP. After the addition, the solution was heated to 40° C. After the heating, 13.09 g (60.00 mmol) of PMDA was added and washing was performed with 10 g of NMP. After 2 hours, the solution was cooled to provide a varnish.

Comparative Example 6

A thermometer and a stirring rod equipped with stirring blades were fitted on a 200 mL four-necked flask. Then, 55 g of NMP was added under a dry nitrogen flow. Subsequently, while stirring is continued at room temperature, 12.01 g (60.00 mmol) of DAE was added and washing was performed with 10 g of NMP. After confirming the dissolution of DAE, the solution was cooled to 10° C. or below. After the cooling, a solution of 0.613 g (6.00 mmol) acetic anhydride diluted with 5 g of NMP was added by pouring over a period of 1 minute and washing was performed with 5 g of NMP. After the addition, the solution was heated to 40° C. After the heating, 13.09 g (60.00 mmol) of PMDA was added and washing was performed with 10 g of NMP. After 2 hours, the solution was cooled to provide a varnish.

Comparative Example 7

A thermometer and a stirring rod equipped with stirring blades were fitted on a 200 mL four-necked flask. Then, 85 g of NMP was added under a dry nitrogen flow, and the temperature was elevated to 60° C. After the temperature elevation, while stirring is continued at room temperature, 3.244 g (30.00 mmol) of PDA was added and washing was performed with 10 g of NMP. After confirming the dissolution of PDA, 8.827 g (30.00 mmol) of BPDA was added and washing was performed with 10 g of NMP. After a period of time, the viscosity of the polymerization solution increased, making it impossible to continue stirring any longer.

Comparative Example 8

A thermometer and a stirring rod equipped with stirring blades were fitted on a 200 mL four-necked flask. Then, 100 g of NMP was added under a dry nitrogen flow, and the temperature was elevated to 60° C. After the temperature elevation, while stirring is continued at room temperature, 6.164 g (57.00 mmol) of PDA was added and washing was performed with 10 g of NMP. After confirming the dissolution of PDA, 17.65 g (60.00 mmol) of BPDA was added and washing was performed with 10 g of NMP. After 4 hours, the solution was cooled to provide a varnish.

Comparative Example 9

A thermometer and a stirring rod equipped with stirring blades were fitted on a 200 mL four-necked flask. Then, 60 g of NMP was added under a dry nitrogen flow, and the temperature was elevated to 60° C. After the temperature elevation, while stirring is continued at room temperature, 3.426 g (30.00 mmol) of CHDA was added and washing was performed with 10 g of NMP. After confirming the dissolution of CHDA, 6.179 g (21.00 mmol) of BPDA and 2.792 g (9.00 mmol) of ODPA were added and washing was performed with 10 g of NMP. After 4 hours, the solution was cooled to provide a varnish.

Comparative Example 10

A thermometer and a stirring rod equipped with stirring blades were fitted on a 200 mL four-necked flask. Then, 75 g of NMP was added under a dry nitrogen flow, and the temperature was elevated to 60° C. After the temperature elevation, while stirring is continued at room temperature, 5.424 g (47.50 mmol) of CHDA was added and washing was performed with 10 g of NMP. After confirming the dissolution of CHDA, 10.30 g (35.00 mmol) of BPDA and 4.653 g (15.00 mmol) of ODPA were added and washing was performed with 10 g of NMP. After 4 hours, the solution was cooled to provide a varnish.

Comparative Example 11

A thermometer and a stirring rod equipped with stirring blades were fitted on a 200 mL four-necked flask. Then, 85 g of NMP was added under a dry nitrogen flow, and the temperature was elevated to 40° C. After the temperature elevation, while stirring is continued at room temperature, 5.106 g (25.50 mmol) of DAE and 0.868 g (3 mmol) of TAM were added and washing was performed with 10 g of NMP. After confirming the dissolution of DAE and TAM, 6.544 g (30.00 mmol) of PMDA was added and washing was performed with 10 g of NMP. After a period of time, the polymerization solution gelated, making it impossible to continue stirring any longer.

Comparative Example 12

A thermometer and a stirring rod equipped with stirring blades were fitted on a 200 mL four-necked flask. Then, 85 g of NMP was added under a dry nitrogen flow, and the temperature was elevated to 40° C. After the temperature elevation, while stirring was continued at room temperature, 5.106 g (25.50 mmol) of DAE and 1.198 g (3 mmol) of TAB were added and washing was performed with 10 g of NMP. After confirming the dissolution of DAE and TAB, 6.544 g (30.00 mmol) of PMDA was added and washing was performed with 10 g of NMP. After a period of time, the polymerization solution gelated, making it impossible to continue stirring any longer.

Tables 1 and 2 show results of evaluation of the varnish specimens prepared in Examples 1 to 11 and Comparative examples 1 to 12 and measurements of the ultimate tensile elongation, ultimate tensile stress, Young's modulus, coefficient of thermal expansion, glass transition temperature, and 5% thermal mass decrease temperature of the polyimide films produced from the varnish specimens.

TABLE 1

| | | | Example | | | | | |
|---|---|---|---|---|---|---|---|---|
| | | | 1 | 2 | 3 | 4*[1] | 5*[1] | 6 |
| acid dianhydride | PMDA | molar ratio | 100 | 100 | 100 | 95 | 95 | |
| | BPDA | | | | | | | 100 |
| | ODPA | | | | | | | |
| diamine compound | DAE | | 100 | 100 | 100 | 100 | 100 | |
| | PDA | | | | | | | 100 |
| | CHDA | | | | | | | |
| | TAM | | | | | | | |
| | TAB | | | | | | | |
| others | diketene cyanoacetic acid | | 5 | 10 | 15 | 10 | 10 | 10 |
| | TsAcOH | | | | | | | |

| evaluation item | unit | | | | | | |
|---|---|---|---|---|---|---|---|
| weight average molecular weight | | 61,700 | 35,800 | 27,100 | 45,700 | 52,700 | 26,200 |
| viscosity (10 wt % NMP) | mPa·s | 142 | 56 | 32 | 78 | 105 | 42 |
| ultimate tensile elongation | % | 99 | 102 | 102 | 109 | 105 | 19 |
| ultimate tensile stress | MPa | 226 | 225 | 226 | 215 | 220 | 289 |
| Young's modulus | GPa | 1.6 | 1.6 | 1.9 | 1.7 | 1.7 | 6.1 |
| coefficient of thermal expansion | ppm/° C. | 34 | 37 | 40 | 36 | 36 | 7.2 |
| glass transition temperature | ° C. | 375 | 362 | 362 | 359 | 361 | 357 |
| 5% heat weight loss temperature | ° C. | 586 | 580 | 572 | 577 | 578 | >600 |

| | | | Example | | | | |
|---|---|---|---|---|---|---|---|
| | | | 7 | 8 | 9 | 10 | 11 |
| acid dianhydride | PMDA | molar ratio | | 100 | 100 | 100 | 100 |
| | BPDA | | 70 | | | | |
| | ODPA | | 30 | | | | |
| diamine compound | DAE | | | | 85 | 85 | 100 | 100 |
| | PDA | | | | | | |
| | CHDA | | | 100 | | | |
| | TAM | | | | 10 | | |
| | TAB | | | | | 10 | |
| others | diketene cyanoacetic acid | | 10 | 15 | 15 | | |
| | | | | | | 10 | |
| | TsAcOH | | | | | | 10 |

| evaluation item | unit | | | | | |
|---|---|---|---|---|---|---|
| weight average molecular weight | | 23,800 | 68,300 | 59,900 | 60,900 | 64,600 |
| viscosity (10 wt % NMP) | mPa·s | 42 | 122 | 145 | 128 | 150 |
| ultimate tensile elongation | % | 10 | 46 | 66 | 115 | 118 |
| ultimate tensile stress | MPa | 214 | 192 | 229 | 265 | 273 |
| Young's modulus | GPa | 5.1 | 2.3 | 2.5 | 2.0 | 1.9 |

TABLE 1-continued

|  | | 27 | 35 | 37 | 36 | 36 |
|---|---|---|---|---|---|---|
| coefficient of thermal expansion | ppm/° C. | 27 | 35 | 37 | 36 | 36 |
| glass transition temperature | ° C. | 260 | 377 | 368 | 371 | 364 |
| 5% heat weight loss temperature | ° C. | 492 | 569 | 581 | 591 | 584 |

*[1]Example 4 and Example 5 use a different production method.

TABLE 2

|  |  |  | Comparative example | | | | | |
|---|---|---|---|---|---|---|---|---|
|  |  |  | 1 | 2 | 3 | 4 | 5 | 6 |
| acid dianhydride | PMDA | molar ratio | 100 | 100 | 95 | 95 | 100 | 100 |
|  | BPDA |  |  |  |  |  |  |  |
|  | ODPA |  |  |  |  |  |  |  |
| diamine compound | DAE |  | 100 | 95 | 100 | 100 | 100 | 100 |
|  | PDA |  |  |  |  |  |  |  |
|  | CHDA |  |  |  |  |  |  |  |
|  | TAM |  |  |  |  |  |  |  |
|  | TAB |  |  |  |  |  |  |  |
| others | DIBOC |  |  |  |  |  | 10 |  |
|  | MA |  |  |  |  |  |  | 10 |
|  | acetic anhydride |  |  |  |  |  |  | 10 |

| evaluation item | unit |  |  |  |  |  |  |
|---|---|---|---|---|---|---|---|
| weight average molecular weight |  | 89,600 | 69,900 | 56,400 | 30,600 | 35,500 | 41,600 |
| viscosity (10 wt % NMP) | mPa · s | 2819 | 844 | 158 | 58 | 67 | 57 |
| ultimate tensile elongation | % | 101 | 52 | 65 | 82 | 102 | 23 |
| ultimate tensile stress | MPa | 228 | 128 | 141 | 153 | 180 | 127 |
| Young's modulus | GPa | 1.6 | 2.0 | 1.6 | 1.6 | 1.8 | 2.0 |
| coefficient of thermal expansion | ppm/° C. | 32 | 35 | 38 | 36 | 38 | 37 |
| glass transition temperature | ° C. | 372 | 366 | 359 | 361 | 370 | 366 |
| 5% heat weight loss temperature | ° C. | 590 | 589 | 584 | 582 | 585 | 584 |

|  |  |  | Comparative example | | | | | |
|---|---|---|---|---|---|---|---|---|
|  |  |  | 7 | 8 | 9 | 10 | 11 | 12 |
| acid dianhydride | PMDA | molar ratio |  |  |  |  | 100 | 100 |
|  | BPDA |  | 100 | 100 | 70 | 70 |  |  |
|  | ODPA |  |  |  | 30 | 30 |  |  |
| diamine compound | DAE |  |  |  |  |  | 85 | 85 |
|  | PDA |  |  | 100 | 95 |  |  |  |
|  | CHDA |  |  |  |  | 100 | 95 |  |
|  | TAM |  |  |  |  |  | 10 |  |
|  | TAB |  |  |  |  |  |  | 10 |
| others | DIBOC |  |  |  |  |  |  |  |
|  | MA |  |  |  |  |  |  |  |
|  | acetic anhydride |  |  |  |  |  |  |  |

| evaluation item | unit |  |  |  |  |  |  |
|---|---|---|---|---|---|---|---|
| weight average molecular weight |  | 102,600 | 26,000 | 74,600 | 29,200 | N.D.*[3] | N.D.*[3] |
| viscosity (10 wt % NMP) | mPa · s | >40000 | 122 | 580 | 62 | N.D.*[3] | N.D.*[3] |
| ultimate tensile elongation | % | N.D.*[1] | 8 | 13 | N.D.*[2] | N.D.*[3] | N.D.*[3] |
| ultimate tensile stress | MPa | N.D.*[1] | 230 | 238 | N.D.*[2] | N.D.*[3] | N.D.*[3] |
| Young's modulus | GPa | N.D.*[1] | 6.8 | 4.7 | N.D.*[2] | N.D.*[3] | N.D.*[3] |
| coefficient of thermal expansion | ppm/° C. | N.D.*[1] | 6.3 | 20 | N.D.*[2] | N.D.*[3] | N.D.*[3] |
| glass transition temperature | ° C. | N.D.*[1] | 364 | 262 | N.D.*[2] | N.D.*[3] | N.D.*[3] |
| 5% heat weight loss temperature | ° C. | N.D.*[1] | >600 | 500 | N.D.*[2] | N.D.*[3] | N.D.*[3] |

*[1]No data (Varnish was so high in viscosity that coating could not be performed.)
*[2]No data (Cured film was so brittle that it was broken when separated from silicon wafer.)
*[3]No data (Varnish gelated to hinder subsequent operations.)

Example 12

The varnish obtained in Example 2 was added to 2 L of water while stirring to precipitate a polymer. After rinsing, the polymer was recovered and dried overnight at 50° C. The polymer thus dried was subjected to $^1$H-NMR measurement to confirm that a structure as given by chemical formula (12) was present in the polymer (FIG. 1).

Comparative Example 13

Figure 2:
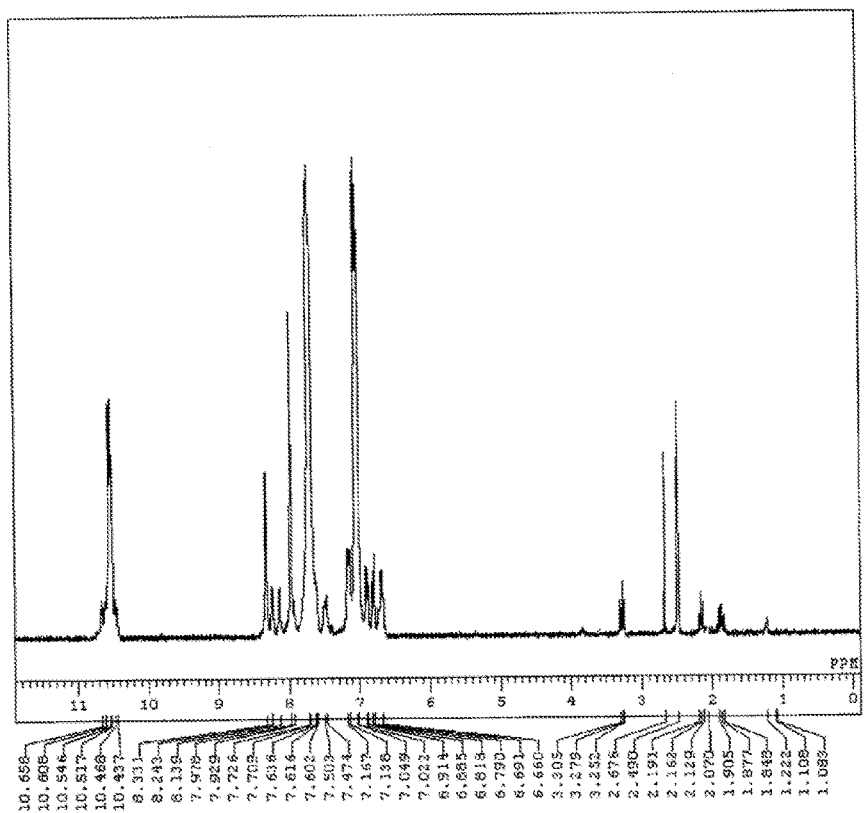
FIG. 2 shows a 1H-NMR spectrum of the polymer prepared in Comparative example 13.

A polymer was produced from the varnish obtained in Comparative example 1 in the same way as in Example 12. This polymer was subjected to $^1$H-NMR measurement (FIG. 2).

INDUSTRIAL APPLICABILITY

The present invention serves to produce polyamic acid that can form a low-viscosity solution. After being cured, the resulting coat film shows good physical properties and can be used favorably as material for surface protect film and interlayer insulation film of semiconductor elements, insulation layers and spacer layers of organic electroluminescent elements (organic EL elements), planarizing film of thin film transistor substrates, insulation layers of organic transistors, flexible printed boards, substrates for flexible display, substrates for flexible electronic paper, substrates for flexible solar batteries, substrates for flexible color filters, binders for electrodes of lithium ion secondary batteries, and adhesives for semiconductors.

The invention claimed is:
1. A production method for polyimide film comprising:
   I) a step of producing resin film containing polyamic acid from a resin composition comprising:
      (a) polyamic acid comprising a structure as represented by chemical formula (1) given below:

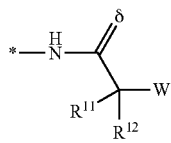
(1)

wherein δ represents an oxygen or sulfur atom and W represents an electron-withdrawing group, and $R^{11}$ and $R^{12}$ represent independently a hydrogen atom or a hydrocarbon group containing 1 to 10 carbon atoms; and
      (b) a solvent; and
   II) a step of imidizing the polyamic acid,
      wherein during imidization of the polyamic acid chemical formula (1) is converted in part into an isocyanate by heating.

2. The production method of claim 1, further comprising a step of drying under a reduced pressure the produced resin film before imidizing the polyamic acid.

3. The production method of claim 1, wherein the structure of the polyamic acid is represented by chemical formula (2) or (3) given below:

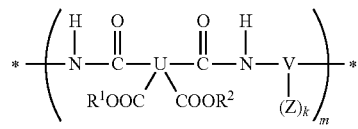
(2)

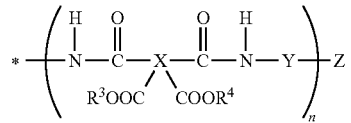
(3)

wherein U and X represent a tetravalent tetracarboxylic acid residue containing 2 or more carbon atoms, V represents a tri- or higher-valent multivalent amine residue containing 2 or more carbon atoms, Y represents a divalent diamine residue containing 2 or more carbon atoms, Z represents a structure represented by chemical formula (1) given above, k, m, and n each represent a positive integer, and $R^1$ to $R^4$ represent independently a hydrogen atom, a hydrocarbon group containing 1 to 10 carbon atoms, or an alkyl silyl group containing 1 to 10 carbon atoms, and
wherein W in chemical formula (1) is represented by any one of chemical formulae (4) to (11);

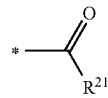
(4)

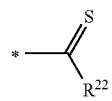
(5)

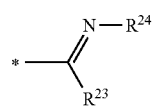
(6)

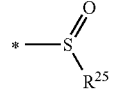
(7)

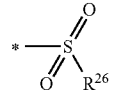
(8)

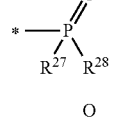
(9)

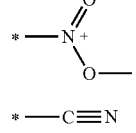
(10)

$* \!\!-\!\!- C \!\equiv\! N$
(11)

wherein $R^{21}$ to $R^{28}$ are independently a hydrocarbon group containing 1 to 10 carbon atoms; or an organic group containing 1 to 10 carbon atoms, wherein said organic group comprises hydrogen and carbon atoms, as well as 1 to 10 other atoms of elements selected from the group consisting of boron, oxygen, sulfur, nitrogen, phosphorus, silicon, and halogens.
4. The production method as described in claim 1, wherein the structure represented by chemical formula (1) is represented by any one of chemical formulae (12) to (14):
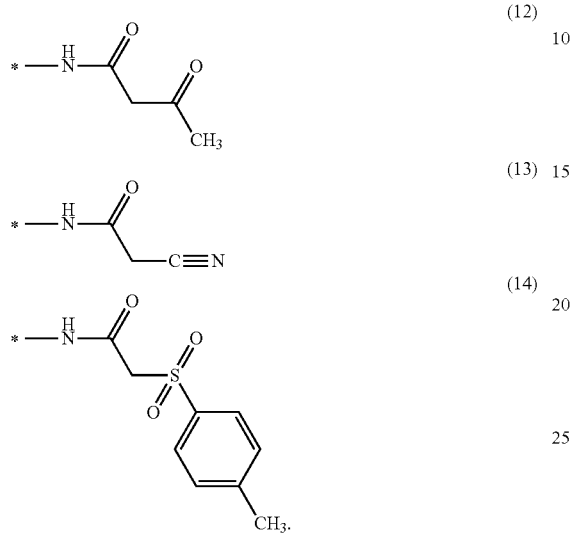
* * * * *